(12) United States Patent
Valia

(10) Patent No.: US 10,898,934 B2
(45) Date of Patent: Jan. 26, 2021

(54) DRUG DISPOSAL DEVICES AND METHODS OF USE

(71) Applicant: Kirti H. Valia, Plainsboro, NJ (US)

(72) Inventor: Kirti H. Valia, Plainsboro, NJ (US)

( * ) Notice: Subject to any disclaimer, the term of this patent is extended or adjusted under 35 U.S.C. 154(b) by 555 days.

(21) Appl. No.: 15/883,530

(22) Filed: Jan. 30, 2018

(65) Prior Publication Data

US 2018/0214917 A1 Aug. 2, 2018

Related U.S. Application Data

(60) Provisional application No. 62/452,197, filed on Jan. 30, 2017, provisional application No. 62/504,355, filed on May 10, 2017.

(51) Int. Cl.
*B09B 3/00* (2006.01)
*B01J 20/20* (2006.01)
*B01J 20/26* (2006.01)
*B01J 20/28* (2006.01)

(52) U.S. Cl.
CPC ............. *B09B 3/0008* (2013.01); *B01J 20/20* (2013.01); *B01J 20/261* (2013.01); *B01J 20/262* (2013.01); *B01J 20/28004* (2013.01); *B01J 20/28033* (2013.01); *B01J 20/28064* (2013.01); *B01J 20/28066* (2013.01); *B09B 3/0075* (2013.01); *B09B 2220/14* (2013.01)

(58) Field of Classification Search
CPC ........ B09B 3/00; B09B 2220/14; B01J 20/20; B01J 20/261; B01J 20/262; B01J 20/28004; B01J 20/28033; B01J 20/28064; B01J 20/28066
USPC .......................................... 588/405
See application file for complete search history.

(56) References Cited

U.S. PATENT DOCUMENTS

| | | |
|---|---|---|
| 7,867,511 B2 | 1/2011 | Anderson et al. |
| 8,329,212 B2 | 12/2012 | Anderson et al. |
| 8,445,010 B2 | 5/2013 | Anderson et al. |
| 8,475,837 B2 | 7/2013 | Anderson et al. |
| 8,535,711 B2 | 9/2013 | Anderson et al. |
| 8,790,583 B2 | 7/2014 | Fowler et al. |
| 8,979,724 B2 | 5/2015 | Fowler et al. |
| 9,339,856 B2 | 5/2016 | Fowler et al. |

*Primary Examiner* — Edward M Johnson
(74) *Attorney, Agent, or Firm* — Potter Anderson and Corroon LLP

(57) ABSTRACT

Drug disposal devices and systems for reducing the amount of drug contained in a transdermal drug delivery patch are disclosed. The drug disposal devices contain an adsorbing substance, such as activated carbon, and are capable of adsorbing residual drug from the transdermal patch and preventing back-extraction of the drug. Also disclosed are methods of manufacturing the drug disposal devices and methods of using the drug disposal devices for reducing the amount of drug contained within a transdermal drug delivery patch.

20 Claims, 2 Drawing Sheets

DRUG DISPOSAL DEVICES AND METHODS OF USE

CROSS-REFERENCE TO RELATED APPLICATIONS

This claims benefit of U.S. Provisional Application No. 62/504,355, filed May 10, 2017, and 62/452,197, filed, Jan. 30, 2017, the entire contents of each of which are incorporated by reference herein.

FIELD

The invention relates to devices, systems, and methods for disposing transdermal drug delivery patches containing residual amounts of drug.

BACKGROUND

The potential for abuse of narcotics and other controlled substances is well documented, and can be exemplified by abuse problems associated with opioids. Opioids are narcotics that have well-known uses as pain analgesics, but also include drugs sold illegally, such as heroin. Fentanyl, in particular, is a powerful synthetic opioid that is similar to morphine but is 50 to 100 times more potent and is often used as part of anesthesia to prevent pain after surgery or other medical procedures. Abuse of fentanyl and other opioids has can be a significant problem among health care professionals and others.

The potential for abuse associated with transdermal drug delivery technology, such as patches, is of particular interest. Transdermal devices offer advantages over more conventional oral or parenteral dosage forms. First, the administration of the drug is non-invasive, and drug delivery can be sustained for several days or more from a single patch, thereby eliminating the need for repeated oral dosage. In addition, the delivery of the drug can be controlled without peaks and valleys, resulting in better side effect profiles, effectiveness, and compliance. Transdermal patches are often used in opioid pain maintenance for patients who may be intolerant of or unable to swallow oral medication. For example, transdermal patches containing fentanyl release the drug over a period of 72 hours, while others opioids patches, such as buprenorphine transdermal delivery devices, can be worn for up to 7 days.

However, to facilitate the kinetics of transdermal delivery, excess drug must be included in the drug reservoir or adhesive in order to deliver the appropriate dose to the patient. Thus, skin-worn patches contain residual drug that can no longer be transdermally delivered at the required dosage rate to the patient, but are in sufficient enough amounts to have the potential for abuse and misuse.

Thus, there is a need for drug disposal devices that reduce or eliminate the residual drug remaining in skin-worn patches in a manner that does not enable its recovery and thereby allow for safe disposal of skin-worn patches while reducing the potential for abuse.

SUMMARY

Aspects of the present invention feature drug disposal devices containing an adsorbing substance, such as activated carbon, and methods of using the same for reducing the level of residual drug in a skin-worn transdermal drug delivery device or patch. The devices described herein are capable of adsorbing drug from the transdermal patch and preventing back-extraction of the drug, thereby reducing the potential for drug abuse.

One aspect of the invention features a drug disposal device for reducing an amount of drug contained in a transdermal patch, the drug disposal device comprising an adsorbing layer disposed between a release liner and a backing film, wherein the adsorbing layer comprises a hydrogel produced from a homogeneous mixture of gel components including: (i) at least about 5% by weight activated carbon; (ii) a binding agent; and (iii) one or more polyols selected from the group consisting of glycerol, polyethylene glycol and a combination of glycerol and polyethylene glycol.

In certain embodiments, the hydrogel is substantially free of air. In some embodiments, the gel components further comprise about 10% by weight to about 20% by weight activated carbon. Additionally, in some embodiments, the activated carbon is steam activated. In yet other embodiments, the activated carbon has a specific surface area in the range from about 850 $m^2/g$ to about 1,900 $m^2/g$, a particle size d50 in the range from about 15 μm to about 30 μm, and a iodine number in the range from about 800 to about 1,750. In still other embodiments, the activated carbon has a specific surface area in the range from about 1,650 $m^2/g$ to about 1,870 $m^2/g$, a particle size d50 in the range from about 18 μm to about 22 μm, and a iodine number in the range from about 1,500 to about 1,700.

In some embodiments, the gel components further comprise about 15% by weight to about 25% by weight polyethylene glycol having an average molecular weight in the range from about 200 g/mol to about 500 g/mol; preferably, the average molecular weight of the polyethylene glycol is in the range from about 300 g/mol to about 500 g/mol; more preferably, the average molecular weight of the polyethylene glycol is about 300 g/mol. In other embodiments, the gel component comprises about 1% by weight to about 15% by weight polyethylene glycol having an average molecular weight in the range of from about 600 g/mol to about 1,000 g/mol. In some embodiments, the gel components further comprise at least one preservative, such as a paraben compound. In some embodiments, the binding agent is a thermoplastic polymer, such as polyvinyl pyrrolidone.

In some embodiments, a scrim substantially embedded in the hydrogel of the adsorbing layer. In particular aspects, the scrim comprises polyester. In yet other embodiments, the release liner comprises low density polyethylene. In some instances, the hydrogel of the adsorbing layer has a thickness in the range from about 15 mil to about 45 mil; preferably, the hydrogel has a thickness in the range of about 20 mil to about 25 mil.

In some embodiments, the drug disposal device has a length of at least about 52 mm and a width of at least about 52 mm; preferably, the length is at least about 79 mm and the width is at least about 79 mm.

In a particular embodiment, the hydrogel comprises about 10% to about 25% by weight activated carbon, about 5% to about 25% by weight polyvinyl pyrrolidone, about 15% to about 25% by weight polyethylene glycol having an average molecular weight of about 300 g/mol, one or more paraben compounds, and water.

Another aspect of the invention features a method for reducing the amount of drug contained in a transdermal patch and utilizes the drug disposal device as summarized above and described in more detail below. The method comprises contacting the drug delivery side of the transdermal patch with the adsorbent layer of the drug disposal device. The contacting is done under conditions permitting adsorption of the drug from the transdermal patch into the drug disposal device, where it is thereby sequestered and recalcitrant to back extraction.

In some embodiments, the amount of drug is at least about 1 mg and the transdermal patch is skin worn, i.e., has been worn on the skin for some amount of time. In other embodiments, the drug is an opioid. In some versions of the method, the contact is for at least about 1 hour; preferably, the contact is for at least about 24 hours; more preferably, the contact is for at least about 48 hours.

Another aspect of the invention features a method of manufacturing a drug disposal device as summarized above. The method includes the steps of (1) producing a homogenous hydrogel mixture by combining a set of ingredients, the ingredients comprising: (a) at least about 5% by weight activated carbon; (b) a binding agent; (c) glycerol or polyethylene glycol; and (d) a water component; (2) coating the homogenous hydrogel onto a release liner or a backing layer at a thickness of at least about 20 mil to produce a homogenous hydrogel layer; and (3) crosslinking the homogeneous hydrogel layer.

In some embodiments, the method further includes the steps of combining the activated carbon and the water component and mixing until homogenous to produce an activated carbon mixture, adding the binding agent to the activated carbon mixture to produce a binding and activated carbon mixture, and adding the glycerol or polyethylene glycol to the binding and activated carbon mixture and mixing to homogeneity to produce the homogenized hydrogel mixture.

In some embodiments, the step of producing the homogeneous hydrogel mixture further comprises dissolving one or more preservatives in the glycerol or polyethylene glycol prior to adding the glycerol or polyethylene glycol to the binding and activated carbon mixture. In other aspects, the homogenous hydrogel mixture is stored for a period of at least 5 days to de-aerate prior to coating onto the backing layer or release liner. In yet other aspects, the homogenous hydrogel mixture is stored for about 5 days to about 21 days to de-aerate prior to coating onto the backing layer or release liner. Furthermore, in some examples the homogenous hydrogel mixture is stored for about 5 days to about 10 to de-aerate.

In some embodiments, the method includes the steps of disposing onto the homogenous hydrogel layer a scrim, wherein the scrim is substantially embedded into the homogenous hydrogel, disposing onto the scrim and homogenous hydrogel layer a backing film, and then crosslinking the homogenous hydrogel layer. Some embodiments further require that the crosslinking comprises ionizing radiation. In yet other embodiments, the homogenous hydrogel ingredients further comprise about 20% by weight activated carbon, about 10% binding agent, about 20% polyethylene glycol, and a water component.

These and other features, aspects, and advantages of the present invention will become better understood with regard to the following description, appended claims, and accompanying drawings.

DETAILED DESCRIPTION

Figure 1A:
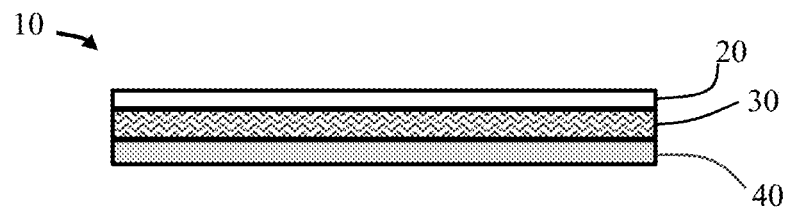
FIG. 1A depicts an embodiment of a drug disposal device.

All percentages expressed herein are by weight of the total weight of the composition or mixture unless expressed otherwise. All ratios expressed herein are on a weight (w/w) basis unless expressed otherwise.

Ranges may be used herein in shorthand, to avoid having to list and describe each value within the range. Any appropriate value within the range can be selected, where appropriate, as the upper value, lower value, or the terminus of the range.

As used herein, the singular form of a word includes the plural, and vice versa, unless the context clearly dictates otherwise. Thus, the references "a", "an", and "the" are generally inclusive of the plurals of the respective terms. For example, reference to "a method" or "a polyol" includes a plurality of such "methods", or "polyols." Likewise the terms "include", "including", and "or" should all be construed to be inclusive, unless such a construction is clearly prohibited from the context. Similarly, the term "examples," particularly when followed by a listing of terms, is merely exemplary and illustrative and should not be deemed exclusive or comprehensive.

The term "comprising" is intended to include embodiments encompassed by the terms "consisting essentially of" and "consisting of". Similarly, the term "consisting essentially of" is intended to include embodiments encompassed by the term "consisting of."

The methods and compositions and other advances disclosed herein are not limited to particular equipment or processes described herein because such equipment or processes may vary. Further, the terminology used herein is for describing particular embodiments only and is not intended to limit the scope of that which is disclosed or claimed.

Unless defined otherwise, all technical and scientific terms, terms of art, and acronyms used herein have the meanings commonly understood by one of ordinary skill in the art in the field(s) of the invention, or in the field(s) where the term is used. Although any compositions, methods, articles of manufacture, or other means or materials similar or equivalent to those described herein can be used in the practice of the present invention, the preferred compositions, methods, articles of manufacture, or other means or materials are described herein.

The term "about" refers to the variation in the numerical value of a measurement, e.g., temperature, length, width, height, weight percentage, etc., due to typical error rates of the device used to obtain that measure. In one embodiment, the term "about" means within 5% of the reported numerical value.

The term "activated carbon patches" is sometimes used herein to refer to certain embodiments of the drug disposal devices that include activated carbon in the adsorbing layer.

The term "substantially free of air" in reference to a gel or hydrogel means that at least about 60% to about 100% of the air is removed from the mixture during storage as compared to the hydrogel prior to the storage. In some embodiments, at least 75% of the air is removed.

The term "substantially embedded" in reference to a scrim and hydrogel means that at least about 75% of the surface area of the scrim is embedded in the hydrogel.

The term "homogeneous" in reference to a mixture means a solid, liquid, or gaseous mixture that has the same proportions of its components throughout a given sample.

The term "hydrogel" as used herein refers to a gel mixture containing water as one of its components.

The term "skin-worn" as used herein refers to a transdermal drug delivery device or patch that has been in contact with the skin of a user (e.g., a patient) for a period of time such that a portion of the drug contained within has transdermally absorbed into the body of that user.

The terms "transdermal" or "transdermal delivery" or "transdermally" as used herein relate to or denote the application of a drug through the skin, typically by using an adhesive patch, so that it is absorbed slowly into the body.

All patents, patent applications, publications, technical and/or scholarly articles, and other references cited or referred to herein are in their entirety incorporated herein by reference to the extent allowed by law. The discussion of those references is intended merely to summarize the assertions made therein. No admission is made that any such patents, patent applications, publications or references, or any portion thereof, are relevant, material, or prior art. The right to challenge the accuracy and pertinence of any assertion of such patents, patent applications, publications, and other references as relevant, material, or prior art is specifically reserved.

In one aspect, the invention features drug disposal devices that reduce the amount of a drug, such as an opioid, from transdermal drug delivery patches, including, but not limited to, reservoir-type membrane-controlled patches and drug-in-adhesive patches, that are designed to transdermally deliver drugs to patients. In some embodiments, the drug disposal devices reduce the amount of residual drug in a skin-worn transdermal patch, such that the drug is adsorbed and sequestered by the drug disposal device and cannot be easily back-extracted. In certain embodiments, the drug disposal devices provided herein includes an adsorbing layer disposed on a backing film, which provides structural support and preserves the adsorbing layer contents. In certain embodiments, the adsorbing layer is disposed between a backing layer and a release liner. In other embodiments, the adsorbing layer is disposed between two release liners, i.e., a top release liner and a bottom release liner. In some embodiments, the adsorbing layer includes a hydrogel, and a scrim is disposed on and at least partially embedded into the hydrogel to provide a structural support matrix. In certain embodiments, the scrim is substantially embedded into the hydrogel. In certain embodiments, the hydrogel of the adsorbing layer contains a suitable amount of adsorbing agent, such as activated carbon, as well as additional binding agents, plasticizers, solvents, and/or preservatives.

The various components of the drug disposal device will now be explained in more detail by way of non-limiting exemplary embodiments.

Adsorbing Layer

The drug disposal device includes an adsorbing layer comprising an adsorbing or binding substance that immobilizes and/or deactivates drug compounds on contact thereby reducing the potential for abuse. The adsorbing layer may also contain an antagonist or irritant compound for added abuse protection. In other aspects, the adsorbing layer is devoid of antagonist or irritant compounds. The adsorbing layer contains one or more substances suitable for adsorbing a drug, such as an opioid. In a preferred embodiment, the adsorbing layer comprises activated carbon. As one skilled in the art will recognize, the activated carbon can be activated by any number of means known in the art, such as steam activation, chemical activation, and the like. In a most preferred aspect, the activated carbon is steam activated.

In particular embodiments, the adsorbing layer is composed of a structurally stable hydrogel. In preferred aspects, the hydrogel is made from a homogeneous mixture of ingredients that include the adsorbing agent (e.g., activated carbon), one or more solvents (e.g., water, a polyol, and/or an alcohol), a binding agent, and/or plasticizer (e.g., polyvinyl pyrrolidone). In some aspects, the hydrogel additionally contains one or more preservatives or other additives, such as drug antagonists or irritants. In a preferred embodiment, the adsorbing agent is an activated carbon preparation. Activated carbon is particularly suited for adsorbing drugs and other molecules and is a form of carbon processed to have small, low-volume pores that increase the surface area available for adsorption. Activated carbon can be produced from a variety of carbonaceous source materials, such as peat, wood, lignite, coal, petroleum pitch, and the like, which are further subjected to physical activation (e.g., steam) or chemical activation (e.g., acid, base, or salt). In particular aspects, the activated carbon suitable for use herein is steam activated.

In an embodiment, the homogeneous hydrogel composition includes activated carbon in an amount that is between about 1% by weight and about 40% by weight; preferably, between about 5% by weight and about 20% by weight. In other embodiments, the activated carbon is present in an amount that is about 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% by weight or more. In more preferred embodiments, the activated carbon is present in an amount that is about 5%, 15%, or 20% by weight. In a most preferred embodiment, about 20% by weight activated carbon is present in the homogeneous.

In certain embodiments, activated carbon suitable for use in the present devices and methods have particular properties that can be measured by one or more parameters, including but not limited to: iodine number, molasses number, specific surface area (Brunauer-Emmett-Teller model or BET), particle size, ash content, and filtration time. For instance, iodine number is a measure of the activity level of the activated carbon, and molasses number is a measure of the mesopore content. Suitable activated carbon preparations may have an iodine number in the range from about 700 to about 1,800, e.g., 700, 750, 800, 850, 900, 950, 1,000, 1,050, 1,100, 1,150, 1,200, 1,250, 1,300, 1,350, 1,400, 1,450, 1,500, 1,550, 1,600, 1,650, 1,700, 1,750, or 1,800. More particularly, the activated carbon preparation has an iodine number between about 800 and about 1,750; even more particularly, between about 1,500 and about 1,700. In certain embodiments, the activated carbon preparation has an iodine number of about 1,550. In addition, suitable activated carbon preparations may have a molasses number in the range from about 150 to about 950, e.g., 150, 200, 250, 300, 350, 400, 450, 500, 550, 600, 750, 800, 850, 900, or 950. More particularly, the activated carbon preparation will have a molasses number between about 180 and about 900, more particularly, between about 240 and about 430. In a specific embodiment, the activated carbon preparation has molasses number of about 430. The specific surface area of activated carbon suitable for use herein is in the range from about 850 $m^2/g$ to about 1,800 $m^2/g$, e.g., 850 $m^2/g$, 900 $m^2/g$, 950 $m^2/g$, 1,000 $m^2/g$, 1,050 $m^2/g$, 1,100 $m^2/g$, 1,100 $m^2/g$, 1,150 $m^2/g$, 1,200 $m^2/g$, 1,250 $m^2/g$, 1,300 $m^2/g$, 1,350 $m^2/g$, 1,400 $m^2/g$, 1,450 $m^2/g$, 1,500 $m^2/g$, 1,550 $m^2/g$, 1,600 $m^2/g$, 1,650 $m^2/g$, 1,700 $m^2/g$, 1,750 $m^2/g$, or 1,800 $m^2/g$. In particular embodiments, the activated carbon has a specific surface area of about 1,650 $m^2/g$ to about 1,750 $m^2/g$. In one embodiment, the activated carbon has a specific surface area of about 1,700 $m^2/g$. The particle size distribution of activated carbon is typically provided as d10, d50, and d90 values. These values indicate the percent of particles that have a diameter that is smaller than the given value. For instance, d50 is the diameter at which 50% of the sample's mass is comprised of smaller particles. Suitable activated carbon preparations will have a d50 from about 15 μm to about 25 μm; particularly, from about 20 μm to about 23 μm. Other properties that may be used to select suitable activated carbon preparations include, but are not limited to, ash content (in the range of about 1% to about 5%; more preferably, from about 2% to about 3%), apparent density (in the range of about 0.35 g/mL to about 0.45 g/mL; more particularly, from about 0.36 g/mL to about 0.42 g/mL; most particularly, from about 0.40 g/mL to about 0.42 g/mL), and filtration time (in the range from about 1 minute to about 13 minutes; particularly, from about 1 minute to about 5 minutes; more particularly, about 2 minutes). In certain embodiments, the activated carbon is NORIT A SUPRA USP or NORIT E SUPRA USP (Cabot NORIT Activated Carbon, Cabot Corporation, Alpharetta Ga.) having the parameters indicated in Table 32.

As discussed herein, the hydrogel contains ingredients in addition to the activated carbon. In an embodiment, the hydrogel formulation includes at least activated carbon, a binding agent, and one or more solvents. For instance, the hydrogel formulation can include 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% by weight or more activated carbon. More specifically, the activated carbon is present in an amount that is about 5%, 15%, or 20% by weight. Additionally, the hydrogel formulations may include one or more binding agents to enhance the ability of the hydrogel to retain its shape and/or stabilize the hydrogel mixture. Binding agents may also add texture to the hydrogel. Suitable binding agents include acacia, alginate, candelilla wax, carnuba wax, corn starch, erythrosine sodium, ethyl cellulose, gelatin, hydroxy propyl cellulose, hydroxy propyl methyl cellulose, hypromellose, lactose hydrous, povidone, polyvinyl pyrrolidone (PVP), potato starch, sodium starch glycolate, starch, and sodium carboxy methyl cellulose. In certain embodiments, PVP is included in the hydrogel. For example, the hydrogel formulation can include 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% by weight or more binding agent. In some embodiments, the hydrogel contains between about 5% and about 25% by weight binding agent. In more particular embodiments, the binding agent is present in an amount that is about 10%, 15%, or 20% by weight. For instance, in certain embodiments, the hydrogel formulation includes about 10% PVP.

Plasticizers can add flexibility and durability to the hydrogel mixture and can be used in addition to or in place of the binding agent. Suitable plasticizers include levulinic acid, lignin, naphthalene, glycerin, glycols, polyethers, propylene glycol, triacetin, and alkyl citrates. For instance, a non-limiting example of a hydrogel formulation may contain glycerin, propylene glycol, levulinic acid, or a combination thereof, in addition to or in place of the binding agent. In these embodiments, the hydrogel formulation can include 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% by weight or more plasticizer.

The hydrogel of the adsorbing layer may also include one or more solvents in the mixture of ingredients. In particular embodiments, at least one of the solvents includes a polyol, such as polyethylene glycol or glycerol. In other embodiments, the solvent is an alcohol. In addition, water is typically used to bring the hydrogel solution to a desired volume. As would be understood by the skilled artisan, water may also be classified as a solvent. In a particular embodiment, a polyol is added to the hydrogel formulation as a solvent. In a specific embodiment, the hydrogel mixture includes polyethylene glycol (PEG). As appreciated by the skilled artisan, PEG solutions are classified by average molecular weight ranging from about 100 g/mol to about 1,000,000 g/mol. PEG solutions suitable for use herein may have an average molecular weight ranging from about 200 g/mol to about 1,000 g/mol, e.g., 200 g/mol, 250 g/mol, 300 g/mol, 350 g/mol, 400 g/mol, 450 g/mol, 500 g/mol, 550 g/mol, 600 g/mol, 650 g/mol, 700 g/mol, 750 g/mol, 800 g/mol, 850 g/mol, 900 g/mol, 950 g/mol, or 1,000 g/mol. The average molecular weight of a particular PEG solutions is typically included in the name. For instance, PEG having an average molecular weight of 400 g/mol is designated PEG 400. In certain embodiments, the hydrogel formulation includes PEG having an average molecular weight of about 300 g/mol to about 500 g/mol; more preferred, about 300 g/mol (e.g., PEG 300). In these embodiments, the hydrogel formulation can include 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, 30% by weight or more polyol. In some embodiments, the hydrogel contains between about 15% and about 25% by weight polyol. In more specific embodiments, the polyol is present in an amount that is about 15% to about 20% by weight. For instance, the hydrogel formulation can include about 20% PEG 300.

It is contemplated that the hydrogel formulations disclosed herein may include additional ingredients, such as suspending agents, dissolution aids, adhesives, thickening agents, and preservatives. For instance, in some embodiments, the hydrogel formulation includes one or more preservatives (e.g., paraben compounds). Paraben compounds, such as methylparaben and propylparaben, may be particularly suitable for use in the hydrogel formulations. Preservatives may be included in the hydrogel formulation in an amount ranging from about 0.2% to about 0.5% by weight; preferably, between about 0.05% and about 0.2% by weight, e.g., 0.05%, 0.06%, 0.07%, 0.08%, 0.09%, 0.1%, 0.11%, 0.12%, 0.13%, 0.14%, 0.15%, 0.16%, 0.17%, 0.18%, 0.19%, or 0.20%.

It should be understood that the adsorbing layer of the drug disposal device provided herein may comprise a hydrogel formulation containing any combination of ingredients described above. Shown in Tables 3, 4, 6, 7, 10-14, 16, 17, 19-21, 23-35, 27, 28, and 30 are non-limiting examples of hydrogel formulations.

Scrim

The scrim serves as a support structure or matrix for the hydrogel prior to crosslinking of the hydrogel. Typically, the hydrogel formulation provided herein is coated or extruded onto a backing film or release liner. The scrim is disposed on top of the hydrogel such that it is at least partially embedded into the hydrogel prior to crosslinking and/or lamination. Preferably, the scrim is substantially embedded into the hydrogel. Scrims may be lightweight, nonwoven, netted fabrics containing netlike openings or mesh holes ranging from about 100 microns to about 1,400 microns and made from polymeric materials such as polypropylene or polyester. In certain embodiments, the thickness of the scrim is of from about 0.5 mil to about 7 mils; more preferably, about 3 mils to about 5 mils. For instance, commercially available scrim materials include 4.4 mil DELNET p530Nat scrim (Delsar Technologies, Middletown, Del., USA) and 4.8 mil REEMAY 2004 polyester scrim (Fiberweb Inc., Old Hickory, Tenn., USA). In one embodiment, a 4.8 mil polyester scrim is substantially embedded into the hydrogel of the adsorbing layer.

Backing Layer

The backing layer (also referred to as backing film or backing) serves as a support for some embodiments of the drug disposal device provided herein and is typically disposed on the surface of the adsorbing layer that is opposite the surface that will make contact with the drug delivery layer (e.g., drug reservoir or drug-in adhesive) of the transdermal drug delivery device or patch. Preferably, the backing film is substantially impermeable to the drug contained in the transdermal drug delivery device. The backing film is typically made of a sheet or film of a flexible elastomeric material and is preferably nonbreathable.

Backing films for use in drug disposal devices of the present disclosure are usually derived from synthetic polymers like polyolefin oils, polyester, polyethylene, polyvinylidine chloride, and polyurethane. Typically, the thickness of the backing film is from about 0.5 mil to about 5 mils; more particularly, about 1 mil to about 3 mils. In one embodiment, the backing film is a 2.3 mil polyester medical tape film with acrylic adhesive (e.g., Cat. #1516, 3M Drug Delivery Systems, St. Paul, Minn., USA) or a SCOTCHPAK 9733 2 mil polyester film (3M Drug Delivery Systems, St. Paul, Minn., USA).

Release Liner

The release liner protects the adsorbing layer and is removed prior to use. In various embodiments, the drug disposal device includes a top release liner disposed over the adsorbing layer (and scrim, if included) and protects the adsorbing layer until the time of use and is peeled off before contacting the transdermal drug delivery device with the adsorbing layer. Typical release liners are from about 0.5 mils to about 8 mils thick, particularly from about 2 mil to about 7 mils thick, and can be made from thermoplastic materials including transparent fluoropolymer coated polyester, low density polyethylene (LDPE), polyethylene terephthalate (PET), LDPE/PET combinations, and the like. In one embodiment, the top release liner is a 2 mil LDPE top release liner (Berry Plastics, Greenville, S.C., USA). In another embodiment, the top release liner is a 7 mil LDPE release liner (Berry Plastics (Covalence), Greenville, S.C., USA). Other suitable release liners are commercially available and include, e.g., 3 mil SCOTCHPAK 1022 fluoropolymer coated polyester release liner (3M Drug Delivery System, St. Paul, Minn., USA).

In some embodiments, the drug disposal device includes a second release liner instead of a backing film. Such second release liners are from about 0.5 mils to about 8 mils thick; more particularly, from about 4 mils to about 7 mils thick, and made from thermoplastic materials including transparent fluoropolymer coated polyester, low density polyethylene (LDPE), polyethylene terephthalate (PET), LDPE/PET combinations, and the like. In a particular embodiment, the second release liner is a 4 mil LDPE/PET release liner (commercially available from Ampac Flexibles, Cary, Ill., USA) or a 7 mil LDPE release liner (Berry Plastics (Covalence), Greenville, S.C., USA).

Fabrication of the Drug Disposal Device

The drug disposal device may be fabricated by first producing the hydrogel containing a uniform, or homogeneous, mixture of the ingredients as described above. In some embodiments, the ingredients can be combined in any order so long as the final hydrogel mixture is sufficiently homogeneous prior to assembly of the drug disposal device. In some embodiments, activated carbon and water are mixed to homogeneity, and then a binding agent or plasticizer are added followed by the addition of a solvent (e.g., PEG 300). For instance, as shown in Example 1, activated carbon and water can be mixed to homogeneity and then combined with PVP and PEG 300. Once the hydrogel formulation is mixed to homogeneity, it can then be transferred into storage tanks to de-aerate. Typical storage times may range from about 5 days to about 21 days, or more, at ambient or room temperature (i.e., about 20° C. to about 25° C.). In one embodiment, the homogeneous hydrogel formulation is stored for sufficient time such that it is substantially free of air, e.g., about 5 to 10 days, or more.

In some embodiments, the homogeneous hydrogel mixture (e.g., de-aerated) is coated or extruded onto a backing film (or second release liner) using, e.g., a stainless steel slot die machine or other art standard coating or extrusion equipment. In general, the homogeneous hydrogel mixture is coated or extruded onto the backing film (or second release liner) at a targeted thickness ranging from about 15 mil to about 40 mil, e.g., 15 mil, 16 mil, 17 mil, 18 mil, 19 mil, 20 mil, 21 mil, 22 mil, 23 mil, 24 mil, 25 mil, 26 mil, 27 mil, 28 mil, 29 mil, 30 mil, 31 mil, 32 mil, 33 mil, 34 mil, 35 mil, 36 mil, 37 mil, 38 mil, 39 mil, or 40 mil. In particular, the targeted thickness is about 25 mil to about 35 mil; more particularly, about 26 mil to about 30 mil. Once the homogeneous hydrogel mixture is disposed onto the backing film (or second release liner), a scrim may be laid over the hydrogel layer such that it is partially or substantially embedded into the hydrogel to provide a structural matrix. In a particular embodiment, a 4.8 mil REEMAY 2004 scrim is laid over and substantially embedded into the hydrogel layer. Next, a release liner is placed over top of the adsorbing layer (the hydrogel and scrim) such that it covers the adsorbing layer. Once the drug disposal device is assembled, it may be passed through a field of ionizing radiation in an accelerator to crosslink the hydrogel mixture to solidify the mixture and to laminate the hydrogel to the backing layer (or second release liner). Lamination and crosslinking techniques are well known in the art.

In another embodiment, the homogeneous hydrogel mixture is first coated or extruded onto a release liner using a stainless steel slot die machine or other art standard coating or extrusion equipment. In this embodiment, the homogeneous hydrogel mixture is coated or extruded onto the release liner at a targeted thickness ranging from about 15 mil to about 40 mil, e.g., 15 mil, 14 mil, 17 mil, 18 mil, 19 mil, 20 mil, 21 mil, 22 mil, 23 mil, 24 mil, 25 mil, 26 mil, 27 mil, 28 mil, 29 mil, 30 mil, 31 mil, 32 mil, 33 mil, 34 mil, 35 mil, 36 mil, 37 mil, 38 mil, 39 mil, or 40 mil. In particular, the targeted thickness is about 25 mil to about 35 mil; more particularly, about 26 mil to about 30 mil. Once the homogeneous hydrogel mixture is disposed onto the release liner, a scrim may be laid over the hydrogel layer such that it is partially or substantially embedded into the hydrogel to provide a structural matrix. Next, a backing film is laminated to the hydrogel surface. The assembly is then passed through a field of ionizing radiation in an accelerator to crosslink the hydrogel mixture to solidify the mixture and to laminate the hydrogel to the backing layer (or second release liner).

Once the assembly is crosslinked, it can then be wound onto a core or spool for further processing or shipping. It is then loaded onto a converting press where a series of cutting and laminating stations transform the assembly into finished drug disposal devices. Suitable sizes of the drug disposal devices are substantially planar (e.g., patches) having a size suitable for accommodating one or more transdermal drug delivery devices for which it will be used. The devices can have a length ranging from about 30 mm to about 200 mm, e.g., 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, or 200 mm; preferably, from about 50 mm to about 150 mm; more particularly, from about 50 mm to about 115 mm; most particularly, from about 50 to about 80 mm. The devices may have a width ranging from about 30 mm to about 200 mm e.g., 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, or 200 mm; particularly, from about 50 mm to about 150 mm; more particularly, from about 50 mm to about 115 mm; most particularly, from about 50 mm to about 80 mm.

Figure 1B:
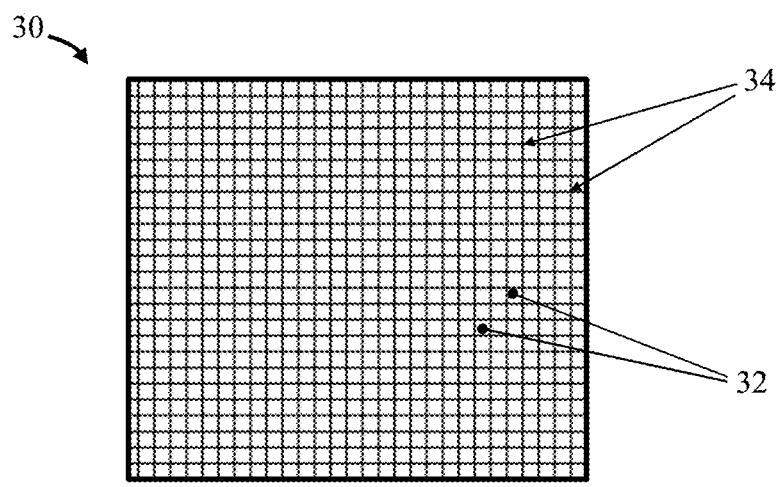
FIG. 1B depicts a top view of an embodiment of an adsorbing layer containing hydrogel with an embedded scrim.
Figure 2A:
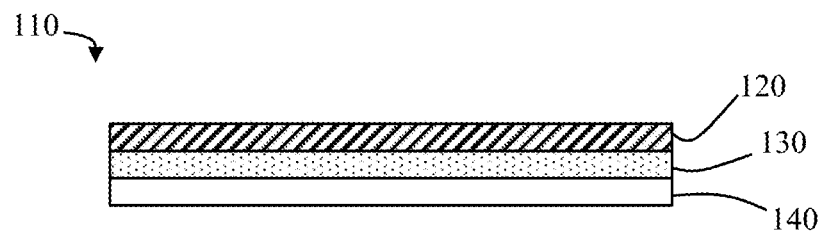
FIG. 2A depicts a drug-in adhesive transdermal delivery device.
Figure 2B:
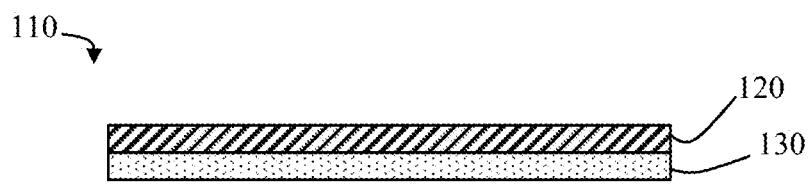
FIG. 2B depicts a drug-in adhesive transdermal delivery device.
Figure 2C:
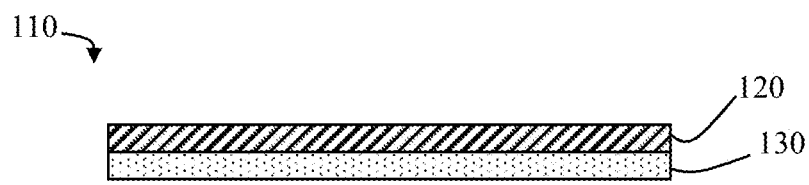
FIG. 2C depicts a drug-in adhesive transdermal delivery device and an embodiment of a drug disposal device.
Figure 2C:
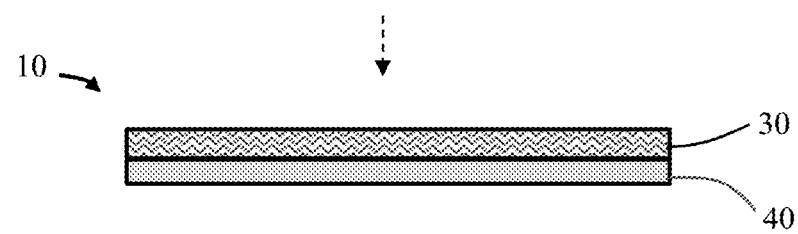
Figure 2D:
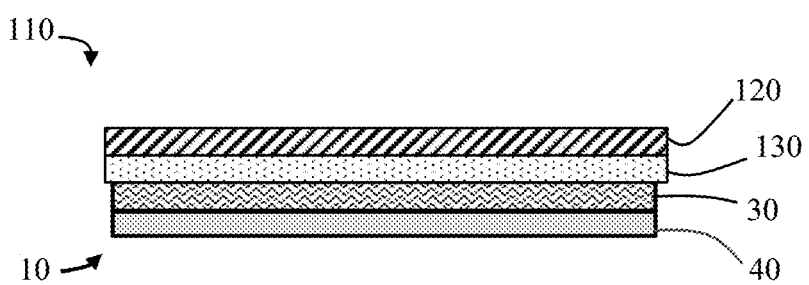
FIG. 2D depicts a use of an embodiment of a drug disposal device with a skin-worn drug-in adhesive transdermal delivery device.

FIGS. 1A and 1B depict a non-limiting exemplary drug disposal device of the present disclosure. Shown in FIG. 1A are three layers of the exemplary drug disposal device 10—a release liner 20, an adsorbing layer 30, and a backing film 40. In some embodiments, the backing film 40 is replaced by a bottom release liner. As shown in FIG. 1B, the adsorbing layer 30 comprises a hydrogel mixture 32 in which is embedded a scrim 34 (mesh-like structure).

Methods for Reducing the Amount of Drug in a Transdermal Drug Delivery Device

Also disclosed herein are methods of using the drug disposal device wherein a transdermal drug delivery device or patch (which may be skin-worn) is contacted to the adsorbing layer of the drug disposal device for a period of time sufficient to allow for the adsorption of the drug from the transdermal drug delivery patch into the adsorbing layer. The methods disclosed herein are suitable for reducing the potential for substance abuse in unworn transdermal drug delivery devices containing about 5 mg to about 20 mg of a drug (e.g., fentanyl or buprenorphine) or in skin-worn transdermal patch devices containing residual amounts of substances after removal of the patch from a first user. The substance to be disposed of can be any drug or pharmaceutical, e.g., the opioids fentanyl, buprenorphine, oxymorphone, sufentanil, alfentanil, oxycodone, methadone, hydrocodone and/or heroin. Typically the drug is one that is prone to abuse. As discussed herein, the drug disposal device of the present invention contains an adsorbing layer with an agent such as activated carbon suitable for adsorbing drugs from the drug delivery surface of the transdermal patch. In addition, the ability of the activated carbon in the devices provided herein retain the drug such that it is very difficult to back-extract the drug from the drug disposal device (see Example 2).

In a typical method of use, a patient on opioid pain maintenance removes the transdermal drug delivery patch from his or her skin. Since the drug load in the patch must be of a high enough quantity to enable transdermal delivery, the skin-worn patch will contain at least a residual amount of drug. This residual drug amount has the potential for abuse and can be extracted from the patch with a solvent, such as alcohol (e.g., ethanol). Thus, the extracted drug can then be made available for injection or other routes of administration. In order to reduce this possibility, the patient simply removes the release liner from the drug disposal device thereby exposing the adsorbing layer. Then, the patient places the skin-worn transdermal delivery device into contact with the drug disposal device so that the drug delivery layer of the patch (e.g., drug reservoir or drug-in adhesive) is in substantially direct contact with the adsorbing layer of the drug disposal device. The adsorbing layer begins to adsorb the drug from the patch thereby reducing the amount of drug in the patch and rendering the drug unavailable for back-extraction or abuse. The period of contact can be anywhere from a couple of seconds about 1 hour or more to begin reducing the amount of drug, e.g., 1 h, 2 h, 3 h, 4 h, 5 h, 6 h, 7 h, 8 h, 9 h, 10 h, 24 h, 2 days, 4 days, 10 days, or more. The patient can simply discard the drug disposal device with the attached skin-worn transdermal patch. The skilled artisan will appreciate that the simple steps described above can be performed by the patient or by another person, such as a caregiver or health care provider.

FIGS. 2A-2D depict an exemplary embodiment of a method of using the drug disposal devices. A drug-in adhesive transdermal drug delivery patch 110 is also shown. The drug delivery patch 110 includes a protective liner 140 and a backing film 120 that is impermeable to the drug contained in the drug reservoir/contact adhesive layer 130. To use this transdermal delivery patch 110, the user removes the protective liner 140 and places the transdermal delivery patch 110 onto the skin such that the drug reservoir/contact adhesive layer 130 is in direct contact with the skin (see FIG. 2B). When the transdermal delivery patch 110 is removed, it will contain at least a residual amount of drug within the drug reservoir/contact adhesive layer 130. The patient takes a drug disposal device 10 and removes the release liner 20 to expose the adsorbing layer 30. Then, the patient places the skin-worn transdermal delivery patch 110 in direct contact with the drug disposal device 10 such that the drug reservoir/contact adhesive layer 130 is in direct contact with the adsorbing layer 30 (see FIGS. 2C and 2D). The transdermal delivery patch 110 can now be disposed of.

Kits and Packaging

The drug disposal devices can be packaged for storage, distribution and use in accordance with any suitable protocol well known to the skilled artisan. For instance, the devices can be packaged into individual or multi-compartment packs or envelopes for storage and delivery. The packs can be packaged separately from or together with, external packaging containing the transdermal drug delivery devices. In one embodiment, packs or pouches containing the drug disposal devices are contained in the same external packaging as the transdermal drug delivery patches, and are sized in accordance with the size of those patches. In another embodiment, they are packaged separately and are of a size suitably large to accommodate different sizes of transdermal drug delivery patches.

Thus, another aspect of the invention comprises kits for use in practice of the present invention. The kits comprise one or more drug disposal devices and instructions for use of the devices to dispose of transdermal drug delivery patches in accordance with the methods described herein. In one embodiment, the kits comprises one or more of the transdermal drug delivery patches and the same number of drug disposal devices.

The following examples describe the invention in greater detail. They are intended to illustrate, rather than to limit, the invention.

Example 1. Fabrication of a Drug Disposal Device

An exemplary embodiment of the drug disposal device was manufactured by first preparing the hydrogel and then casting and crosslinking the hydrogel onto a backing film and release liner. First, Mixture A and Mixture B were prepared according to Table 1.

TABLE 1

| Formulation of the Hydrogel | |
| --- | --- |
| Mixture A: | Dissolved the preservatives (e.g., methylparaben and propylparaben) in polyethylene glycol (PEG) 300. |
| Mixture B: | Step 1: Added activated carbon to water and mixed until homogenous. Step 2: Added the binding agent (e.g., polyvinyl pyrrolidone) to the homogeneous activated carbon and water mixture. |

Then, Mixture A and Mixture B were combined and mixed until homogenous to produce the hydrogel. The hydrogel was then stored at room temperature for several days to de-aerate and produce a hydrogel that was substantially free of air. The casting and crosslinking of the hydrogel was then carried out. First, the hydrogel was extruded onto a 2 mil LDPE release liner (Berry Plastics, Greenville, S.C., USA) at a targeted thickness of about 26 mil to about 30 mil. A 4.8 mil REEMAY 2004 polyester scrim (Fiberweb, Inc., Old Hickory, Tenn., USA) was laid into the surface of the hydrogel and embedded into the hydrogel. Then, single coated 2.3 mil polyester medical tape with acrylate adhesive (#1516 3M Products) was used as a backing film and placed over the hydrogel and scrim to cover both. The assembly was crosslinked by passing it through DYNAMITRON DPC-2000 electron beam accelerator (IBA Industrial, Edgewood, N.Y., USA) at the appropriate process parameters (i.e., 1.0 MeV, 6.0 mA, 10 feet per minute). After crosslinking the hydrogel, the assembly was collected for cutting. The assembly was cut to 52 mm×52 mm, 52 mm×74 mm, or 79 mm×79 mm size drug disposal devices (referred to herein as "activated carbon patches") using a cutting press and steel rule die. Table 2 provides exemplary measurements for the drug disposal devices made according to this Example 1.

TABLE 2

| Dimensions of Exemplary Drug Disposal Devices. | | | |
| --- | --- | --- | --- |
| Size (l × w) | 52 mm × 52 mm | 52 mm × 74 mm | 79 mm × 79 mm |
| Average Patch Gross Weight | 2.751 g | 3.900 g | 6.411 g |
| Backing + Scrim + Release Liner | 0.681 g | 0.968 g | 1.574 g |
| Gel per Patch Weight | 2.070 g | 2.932 g | 4.837 g |
| Patch Thickness | 0.0265"-0.0300" | 0.0265"-0.0300" | 0.0265"-0.0300" |
| Backing Film | 3M 1516 | 3M 1516 | 3M 1516 |

There are various suitable hydrogel formulations that can be used in the drug disposal device. Tables 3 provides a preferred exemplary hydrogel formulation containing 20% by weight of NORIT A Supra USP activated carbon (Norit Americas Inc., Marshall, Tex., USA). The exemplary mixture also included 10% by weight KOLLIDON 90F PVP (Mutchler, Inc., Harrington Park, N.J., USA) and 20% by weight PEG 300.

TABLE 3

20% Activated Carbon Patch Formulation:

| Ingredients | Percent, % | Amount, gms |
|---|---|---|
| Kollidon 90F (PVP) | 10.00 | 800.00 |
| Norit A Supra USP (Activated Carbon) | 20.00 | 1600.20 |
| Methylparaben | 0.18 | 14.40 |
| Propylparaben | 0.05 | 4.00 |
| Polyethylene Glycol 300 (PEG 300) | 20.00 | 1600.00 |
| Purified Water | 49.77 | 3981.60 |
| Total | 100.00 | 8,000.20 |

| Patch Lot # | | | |
|---|---|---|---|
| Size | 52 mm × 52 mm | 52 mm × 74 mm | 79 mm × 79 mm |
| Average Patch Gross Weight | 2.751 g | 3.900 g | 6.411 g |
| Backing + Scrim + Release Liner Weight | 0.681 g | 0.968 g | 1.574 g |
| Gel per Patch Weight | 2.070 g | 2.932 g | 4.837 g |
| Patch Thickness | 0.0265"-0.0300" | 0.0265"-0.0300" | 0.0265"-0.0300" |
| Backing Film | 3M 1516 | 3M 1516 | 3M 1516 |

Example 2. Buprenorphine Extraction Tests

Several hydrogel formulations were prepared and tested in drug disposal devices of various sizes and thicknesses. The drug disposal devices (i.e., activated carbon patches) were manufactured as described elsewhere herein. Briefly, in these particular embodiments, the hydrogel formulations were extruded onto a bottom release liner (BRL) that was either a 4 mil LDPE/PET release liner (Ampac Flexibles, Cary, Ill., USA) or a 7 mil LDPE release liner (Berry Plastics, Greenville, S.C., USA) at the indicated thicknesses. A 4.4 mil DELNET p530Nat scrim (Delsar Technologies, Middletown, Del., USA) or a 4.8 mil REEMAY 2004 scrim (Fiberweb Inc., Old Hickory, Tenn., USA) was laid on top of the hydrogel. A 2 mil LDPE top release liner (TRL) (Berry Plastics, Greenville, S.C., USA) was laminated onto the scrim and hydrogel layers and crosslinked by a DYNA-MITRON DPC-2000 electron beam accelerator (IBA Industrial, Edgewood, N.Y., USA) at the appropriate process parameters (i.e., 1.0 MeV, 6.0 mA, 10 feet per minute). The crosslinked material was then cut into the dimensions indicated below using a cutting press and steel rule die.

To assess the ability of the drug disposal devices to reduce the level of drug from a transdermal patch, the drug disposal devices were attached to buprenorphine transdermal patches (BTDS) containing 5 mg, 10 mg, or 20 mg buprenorphine (Core Tech Solutions, Inc., East Windsor, N.J., USA). First, the top release layer was peeled off of the drug disposal device. Then, the drug reservoir of the transdermal patch was contacted to the activated carbon layer of the drug disposal device for 1, 2, 4, 8, 24, or 48 hours. The transdermal patch and the drug disposal device were separated and each individually extracted in 100 ml of methanol for 24 hours. The levels of buprenorphine extracted from each were measured using high performance liquid chromatography (HPLC) according to standard art methods. The extraction test results for the various hydrogel formulations and drug disposal devices are summarized in Tables 4-31.

TABLE 4

Formulation 1 (5% Activated Carbon)

| Ingredients | Percent | Theoretical amount, g | Actual amount, g |
|---|---|---|---|
| PVP | 22.00 | 1100.0 | 1010.0 |
| Norit A Activated Carbon | 5.00 | 250.0 | 250.0 |
| Methylparaben | 0.18 | 9.0 | 9.0 |
| Propylparaben | 0.05 | 2.5 | 2.5 |
| PEG 300 | 27.00 | 1350.0 | 1350.0 |
| DI Water | 45.77 | 2288.5 | 2290.6 |
| Total | 100.00 | 5000.0 | 4912.1 |

Weight (10 cm × 10 cm)(n = 10):

| | |
|---|---|
| Bottom Release Liner (BRL): | 1.16 g |
| Release Liner (TRL): | 0.19 g |
| Scrim (S): | 0.51 g |
| BRL + TRL + S: | 1.86 g |
| Average Patch Weight: | 10.28 g |
| Gel per Patch Weight: | 8.42 g |

Thickness:

| | |
|---|---|
| Bottom Release Liner (BRL): | 4.0 mil |
| Top Release Liner (TRL): | 2.0 mil |
| Scrim (S): | 4.4 mil |
| BRL + TRL + S: | 10.4 mil |
| Patch Thickness: | 35.4 mil |
| Gel Thickness: | 25.0 mil |

TABLE 5

Results with Formulation 1

| Activated Carbon Patch (C Patch) | BTDS | BTDS Extract Amount, mg (%) Remained | C Patch Extract Amount, mg (%) Remained |
|---|---|---|---|
| 5% Activated Carbon (7.2 cm × 7.2 cm) | BTDS 20 mg | a. 8.43 mg (42.2%)<br>b. 8.22 mg (41.1%)<br>c. 8.30 mg (41.5%)<br>d. 8.27 mg (41.4%)<br>e. 8.28 mg (41.4%) | a. 0.45 mg (2.3%)<br>b. 0.35 mg (1.8%)<br>c. 0.34 mg (1.7%)<br>d. 0.33 mg (1.7%)<br>e. 0.33 mg (1.7%) |
| 5% Activated Carbon (4.5 cm × 4.5 cm) | BTDS 5 mg | a. 2.17 mg (43.4%)<br>b. 2.44 mg (48.8%)<br>c. 2.19 mg (43.8%)<br>d. 2.22 mg (44.4%)<br>e. 2.37 mg (47.4%) | a. 0.04 mg (0.8%)<br>b. 0.03 mg (0.6%)<br>c. 0.08 mg (1.6%)<br>d. 0.03 mg (0.6%)<br>e. 0.03 mg (0.6%) |

TABLE 6

Formulation 2 (10% Activated Carbon)

| Ingredients | Percent | Theoretical amount, g | Actual amount, g |
|---|---|---|---|
| PVP | 20.00 | 270.0 | 270.0 |
| Norit A Activated Carbon | 10.00 | 135.0 | 135.0 |
| Methylparaben | 0.18 | 2.4 | 2.4 |
| Propylparaben | 0.05 | 0.7 | 0.7 |
| Levulinic Acid | 5.00 | 67.5 | 67.5 |
| PEG 300 | 20.00 | 270.0 | 270.0 |
| DI Water | 44.77 | 604.4 | 604.4 |
| Total | 100.00 | 1350.0 | 1350.0 |

TABLE 7

Formulation 3 (15% Activated Carbon)

| Ingredients | Percent | Theoretical amount, g | Actual amount, g |
|---|---|---|---|
| PVP | 20.00 | 600.0 | 600.0 |
| Norit A Activated Carbon | 15.00 | 450.0 | 450.0 |
| Methylparaben | 0.18 | 5.4 | 5.4 |
| Propylparaben | 0.05 | 1.5 | 1.5 |
| PEG 300 | 20.00 | 600.0 | 600.0 |
| DI Water | 44.77 | 1343.1 | 1343.1 |
| Total | 100.00 | 3000.0 | 3000.0 |

| | Form. 2 | Form. 3 |
|---|---|---|
| Weight (10 cm × 10 cm)(n = 10): | | |
| Bottom Release Liner (BRL): | 1.16 g | 1.16 g |
| Top Release Liner (TRL): | 0.19 g | 0.19 g |
| Scrim (S): | 0.50 g | 0.50 g |
| BRL + TRL + S: | 1.85 g | 1.85 g |
| Average Patch Weight: | 10.65 g | 10.83 g |
| Gel per Patch Weight: | 8.80 g | 8.98 g |
| Thickness: | | |
| Bottom Release Liner (BRL): | 4.0 mil | 4.0 mil |
| Top Release Liner (TRL): | 2.0 mil | 2.0 mil |
| Scrim Reemay 2004 (S): | 4.8 mil | 4.8 mil |
| BRL + TRL + S: | 10.8 mil | 10.8 mil |
| Patch Thickness: | 36.0 mil | 36.7 mil |
| Gel Thickness: | 25.8 mil | 25.9 mil |

TABLE 8

Results with Formulations 2 and 3

| Activated Carbon Patch (C Patch) | BTDS | BTDS Extract Amount, mg (%) Remained | C Patch Extract Amount, mg (%) Remained |
|---|---|---|---|
| 10% Activated Carbon Formulation 2 (10 cm × 10 cm) (5% Levulinic Acid) | BTDS 20 mg | a. 4.17 mg (20.9%) b. 3.97 mg (19.9%) c. 4.94 mg (24.7%) d. 4.95 mg (24.8%) | a. 0.72 mg (3.6%) b. 0.61 mg (3.1%) c. 0.65 mg (3.3%) d. 0.62 mg (3.1%) |
| 15% Activated Carbon Formulation 3 (10 cm × 10 cm) | BTDS 20 mg | a. 4.15 mg (20.8%) b. 4.81 mg (24.1%) c. 5.90 mg (29.6%) d. 5.61 mg (28.1%) | a. 0.14 mg (0.7%) b. 0.10 mg (0.5%) c. 0.07 mg (0.4%) d. 0.08 mg (0.4%) |
| 10% Activated Carbon Formulation 2 (10 cm × 10 cm) (5% Levulinic Acid) | BTDS 5 mg | a. 1.40 mg (28.0%) b. 1.32 mg (26.4%) c. 1.51 mg (30.2%) d. 1.52 mg (30.4%) | a. 0.07 mg (1.4%) b. 0.12 mg (2.4%) c. 0.25 mg (5.0%) d. 0.19 mg (3.8%) |
| 15% Activated Carbon Formulation 3 (10 cm × 10 cm) | BTDS 5 mg | a. 1.47 mg (29.4%) b. 1.25 mg (25.0%) c. 1.64 mg (32.8%) d. 1.60 mg (32.0%) | a. 0.02 mg (0.4%) b. 0.03 mg (0.6%) c. 0.03 mg (0.6%) d. 0.05 mg (1.0%) |

TABLE 9

Results with Formulations 1, 2 and 3

| Activated Carbon Patch (C Patch) | BTDS | BTDS Extract Amount, mg (%) Remained after 72 hr | C Patch Extract Amount, mg (%) First Patch | C Patch Extract Amount, mg (%) Second Patch |
|---|---|---|---|---|
| 5% Carbon Patch Formulation 1 (10 cm × 10 cm) | BTDS 20 mg | a. 1.92 mg (9.6%) b. 1.67 mg (8.4%) | a. 0.65 mg (3.3%) b. 0.71 mg (3.6%) | a. 0.04 mg (0.2%) b. 0.05 mg (0.3%) |
| 10% Carbon Patch Formulation 2 (10 cm × 10 cm) | BTDS 20 mg | a. 0.61 mg (3.1%) b. 0.65 mg (3.3%) | a. 0.64 mg (3.2%) b. 0.57 mg (2.9%) | a. 0.06 mg (0.3%) b. 0.07 mg (0.4%) |
| 15% Carbon Patch Formulation 3 (10 cm × 10 cm) | BTDS 20 mg | a. 0.79 mg (4.0%) b. 0.85 mg (4.3%) | a. 0.13 mg (0.7%) b. 0.14 mg (0.7%) | a. ND b. ND |

TABLE 10

Formulation 4 (10% Activated Carbon)

| Ingredients | Percent | Theoretical amount, g | Actual amount, g |
|---|---|---|---|
| PVP | 20.00 | 200.0 | 200.0 |
| Norit A Activated Carbon | 10.00 | 100.0 | 100.0 |
| Methylparaben | 0.18 | 1.8 | 1.8 |
| Propylparaben | 0.05 | 0.5 | 0.5 |
| Levulinic Acid | 10.00 | 100.0 | 99.9 |
| PEG 300 | 20.00 | 200.0 | 200.2 |
| DI Water | 39.77 | 397.7 | 397.8 |
| Total | 100.00 | 1000.0 | 1000.2 |

TABLE 11

Formulation 5 (10% Activated Carbon):

| Ingredients | Percent | Theoretical amount, g | Actual amount, g |
|---|---|---|---|
| PVP | 20.00 | 200.0 | 200.1 |
| Norit A Activated Carbon | 10.00 | 100.0 | 100.0 |
| Methylparaben | 0.18 | 1.8 | 1.8 |
| Propylparaben | 0.05 | 0.5 | 0.5 |
| Levulinic Acid | 15.00 | 150.0 | 150.0 |
| PEG 300 | 20.00 | 200.0 | 199.9 |
| DI Water | 34.77 | 347.7 | 347.7 |
| Total | 100.00 | 1000.0 | 1000.0 |

TABLE 12

Formulation 6 (15% Activated Carbon)

| Ingredients | Percent | Theoretical amount, g | Actual amount, g |
|---|---|---|---|
| PVP | 20.00 | 200.0 | 200.0 |
| Norit A Activated Carbon | 15.00 | 150.0 | 150.0 |
| Methylparaben | 0.18 | 1.8 | 1.8 |
| Propylparaben | 0.05 | 0.5 | 0.5 |
| Levulinic Acid | 5.00 | 50.0 | 49.8 |
| PEG 300 | 20.00 | 200.0 | 200.2 |
| DI Water | 39.77 | 397.7 | 397.8 |
| Total | 100.00 | 1000.0 | 1000.1 |

TABLE 13

Formulation 7 (15% Activated Carbon)

| Ingredients | Percent | Theoretical amount, g | Actual amount, g |
|---|---|---|---|
| PVP | 20.00 | 200.0 | 200.1 |
| Norit A Activated Carbon | 15.00 | 150.0 | 150.0 |
| Methylparaben | 0.18 | 1.8 | 1.8 |
| Propylparaben | 0.05 | 0.5 | 0.5 |
| Levulinic Acid | 10.00 | 100.0 | 100.1 |
| PEG 300 | 20.00 | 200.0 | 200.0 |
| DI Water | 34.77 | 347.7 | 347.8 |
| Total | 100.00 | 1000.0 | 1000.3 |

TABLE 14

Formulation 8 (10% Activated Carbon)

| Ingredients | Percent | Theoretical amount, g | Actual amount, g |
|---|---|---|---|
| PVP | 20.00 | 200.0 | 200.0 |
| Norit A Activated Carbon | 10.00 | 100.0 | 100.0 |
| Methylparaben | 0.18 | 1.8 | 1.8 |
| Propylparaben | 0.05 | 0.5 | 0.5 |
| Levulinic Acid | 10.00 | 100.0 | 100.1 |
| PEG 300 | 15.00 | 150.0 | 150.1 |
| Propylene Glycol | 5.00 | 50.0 | 49.9 |
| DI Water | 39.77 | 397.7 | 397.7 |
| Total | 100.00 | 1000.0 | 1000.1 |

| Weight (10 cm × 10 cm)(n = 10): | Aver Patch Weight | BRL + TRL + S | Gel/Patch Weight |
|---|---|---|---|
| Form. 4 | 11.19 g | 1.86 g | 9.33 g |
| Form. 5 | 11.17 g | 1.86 g | 9.31 g |
| Form. 6 | 11.47 g | 1.86 g | 9.61 g |
| Form. 7 | 11.72 g | 1.86 g | 9.86 g |
| Form. 8 | 11.09 g | 1.86 g | 9.23 g |

| Thickness: | Patch Thickness | BRL + TRL + S | Gel Thickness |
|---|---|---|---|
| Form. 4 | 36.4 mil | 10.4 mil | 36.0 mil |
| Form. 5 | 36.0 mil | 10.4 mil | 25.6 mil |
| Form. 6 | 38.5 mil | 10.4 mil | 28.1 mil |
| Form. 7 | 38.2 mil | 10.4 mil | 27.8 mil |
| Form. 8 | 36.8 mil | 10.4 mil | 26.4 mil |

TABLE 15

Results for Formulations 4-8

| Activated Carbon Patch (C Patch) | BTDS | BTDS Extract Amount, mg (%) Remained | C Patch Extract Amount, mg (%) Remained |
|---|---|---|---|
| 10% Activated Carbon Form. 4 (10 cm × 10 cm) 10% LA, 20% PEG300 | BTDS 20 mg | a. 4.51 mg (22.6%) b. 4.64 mg (23.2%) | a. 1.04 mg (5.2%) b. 1.34 mg (6.7%) |
| 10% Activated Carbon Form. 5 (10 cm × 10 cm) 15% LA, 20% PEG300 | BTDS 20 mg | a. 5.07 mg (25.4%) b. 4.96 mg (24.8%) | a. 1.14 mg (5.7%) b. 1.20 mg (6.0%) |
| 15% Activated Carbon Form. 6 (10 cm × 10 cm) 5% LA, 20% PEG300 | BTDS 20 mg | a. 6.53 mg (32.7%) b. 6.40 mg (32.0%) | a. 0.23 mg (1.2%) b. 0.27 mg (1.4%) |

TABLE 15-continued

Results for Formulations 4-8

| Activated Carbon Patch (C Patch) | BTDS | BTDS Extract Amount, mg (%) Remained | C Patch Extract Amount, mg (%) Remained |
|---|---|---|---|
| 15% Activated Carbon Form. 7 (10 cm × 10 cm) 10% LA, 20% PEG300 | BTDS 20 mg | a. 6.62 mg (33.1%) b. 6.47 mg (32.4%) | a. 0.61 mg (3.1%) b. 0.36 mg (1.8%) |
| 10% Activated Carbon Form. 8 (10 cm × 10 cm) 10% LA, 15% PEG300, 5% PG | BTDS 20 mg | a. 5.68 mg (28.4%) b. 4.51 mg (22.6%) | a. 1.02 mg (5.1%) b. 1.22 mg (6.1%) |

TABLE 16

Formulation 9 (10% Activated Carbon):

| Ingredients | Percent | Theoretical amount, g | Actual amount, g |
|---|---|---|---|
| PVP | 17.00 | 510.0 | 510.0 |
| Norit A Activated Carbon | 10.00 | 300.0 | 300.0 |
| Methylparaben | 0.18 | 5.4 | 5.4 |
| Propylparaben | 0.05 | 1.5 | 1.5 |
| PEG 300 | 27.00 | 810.0 | 810.0 |
| DI Water | 45.77 | 1373.1 | 1373.1 |
| Total | 100.00 | 3000.0 | 3000.0 |

TABLE 17

Formulation 10 (10% Activated Carbon)

| Ingredients | Percent | Theoretical amount, g | Actual amount, g |
|---|---|---|---|
| PVP | 17.00 | 510.0 | 510.0 |
| Norit A Activated Carbon | 10.00 | 300.0 | 300.0 |
| Methylparaben | 0.18 | 5.4 | 5.4 |
| Propylparaben | 0.05 | 1.5 | 1.5 |
| Glycerin | 27.00 | 810.0 | 810.0 |
| DI Water | 45.77 | 1373.1 | 1373.1 |
| Total | 100.00 | 3000.0 | 3000.0 |

| Weight (10 cm × 10 cm)(n = 10): | Aver Patch Weight | BRL + TRL + S | Gel/Patch Weight |
|---|---|---|---|
| Form. 9A | 10.41 g | 1.85 g | 8.56 g |
| Form. 9B | 14.67 g | 1.85 g | 12.82 g |
| Form. 9C | 18.81 g | 1.85 g | 16.96 g |
| Form. 10 | 10.46 g | 1.85 g | 8.61 g |

| Thickness: | Patch Thickness | BRL + TRL + S | Gel Thickness |
|---|---|---|---|
| Form. 9A | 33.0 mil | 10.8 mil | 22.2 mil |
| Form. 9B | 44.7 mil | 10.8 mil | 33.9 mil |
| Form. 9C | 54.8 mil | 10.8 mil | 44.0 mil |
| Form. 10 | 35.7 mil | 10.8 mil | 24.9 mil |

TABLE 18

Results with Formulations 9 and 10:

| Activated Carbon Patch (C Patch) | BTDS | BTDS Extract Amount, Remained | C Patch Extract Amount, Remained |
|---|---|---|---|
| 10% Activated Carbon Form. 9A | BTDS 5 mg | a. 1.63 mg (32.6%) b. 1.66 mg (33.2%) | ND ND |
| (10 cm × 10 cm)(8.56 g Gel Weight)(PEG 300) | | | |
| 10% Activated Carbon Form. 9B | BTDS 5 mg | a. 1.67 mg (33.4%) b. 1.63 mg (32.6%) | ND ND |
| (10 cm × 10 cm)(12.82 g Gel Weight)(PEG 300) | | | |
| 10% Activated Carbon Form. 9C | BTDS 5 mg | a. 1.80 mg (36.0%) b. 1.64 mg (32.8%) | ND ND |
| (10 cm × 10 cm)(16.96 g Gel Weight)(PEG 300) | | | |
| 10% Activated Carbon Form. 10 | BTDS 5 mg | a. 2.93 mg (58.6%) b. 3.32 mg (66.4%) | ND ND |
| (10 cm × 10 cm)(8.61 g Gel Weight)(Glycerin) | | | |
| 10% Activated Carbon Form. 9A | BTDS 10 mg | a. 3.13 mg (31.3%) b. 3.20 mg (32.0%) | ND ND |
| (10 cm × 10 cm)(8.56 g Gel Weight)(PEG 300) | | | |
| 10% Activated Carbon Form. 9B | BTDS 10 mg | a. 2.93 mg (29.3%) b. 2.96 mg (29.6%) | ND ND |
| (10 cm × 10 cm)(12.82 g Gel Weight)(PEG 300) | | | |

TABLE 18-continued

Results with Formulations 9 and 10:

| Activated Carbon Patch (C Patch) | BTDS | BTDS Extract Amount, Remained | C Patch Extract Amount, Remained |
|---|---|---|---|
| 10% Activated Carbon Form. 9C (10 cm × 10 cm)(16.96 g Gel Weight)(PEG 300) | BTDS 10 mg | a. 3.24 mg (32.4%) b. 2.89 mg (28.9%) | ND ND |
| 10% Activated Carbon Form. 10 (10 cm × 10 cm)(8.61 g Gel Weight)(Glycerin) | BTDS 10 mg | a. 6.14 mg (61.4%) b. 6.09 mg (60.9%) | ND ND |
| 10% Activated Carbon Form. 9A (10 cm × 10 cm)(8.56 g Gel Weight)(PEG 300) | BTDS 20 mg | a. 6.04 mg (30.2%) b. 5.31 mg (26.6%) | ND ND |
| 10% Activated Carbon Form. 9B (10 cm × 10 cm)(12.82 g Gel Weight)(PEG 300) | BTDS 20 mg | a. 5.76 mg (28.8%) b. 5.88 mg (29.4%) | ND ND |
| 10% Activated Carbon Form. 9C (10 cm × 10 cm)(16.96 g Gel Weight)(PEG 300) | BTDS 20 mg | a. 5.79 mg (29.0%) b. 5.96 mg (29.8%) | ND ND |
| 10% Activated Carbon Form. 10 (10 cm × 10 cm)(8.61 g Gel Weight)(Glycerin) | BTDS 20 mg | a. 12.72 mg (63.6%) b. 12.72 mg (63.6%) | ND ND |

TABLE 19

Formulation 11 (20% Activated Carbon):

| Ingredients | Percent | Theoretical amount, g | Actual amount, g |
|---|---|---|---|
| PVP | 20.00 | 400.0 | 400.0 |
| Norit A Activated Carbon | 20.00 | 400.0 | 400.0 |
| Methylparaben | 0.18 | 3.6 | 3.6 |
| Propylparaben | 0.05 | 1.0 | 1.0 |
| PEG 300 | 20.00 | 400.0 | 400.0 |
| DI Water | 39.77 | 795.4 | 795.4 |
| Total | 100.00 | 2000.0 | 2000.0 |

TABLE 20

Formulation 12 (20% Activated Carbon):

| Ingredients | Percent | Theoretical amount, g | Actual amount, g |
|---|---|---|---|
| PVP | 15.00 | 300.0 | 300.0 |
| Norit A Activated Carbon | 20.00 | 400.0 | 400.0 |
| Methylparaben | 0.18 | 3.6 | 3.6 |
| Propylparaben | 0.05 | 1.0 | 1.0 |
| PEG 300 | 20.00 | 400.0 | 400.0 |
| DI Water | 44.77 | 895.4 | 895.4 |
| Total | 100.00 | 2000.0 | 2000.0 |

TABLE 21

Formulation 13 (20% Activated Carbon):

| Ingredients | Percent | Theoretical amount, g | Actual amount, g |
|---|---|---|---|
| PVP | 10.00 | 20.0 | 13.5 |
| Norit A Activated Carbon | 20.00 | 40.0 | 27.0 |
| Methylparaben | 0.18 | 0.36 | 0.2 |
| Propylparaben | 0.05 | 0.10 | 0.1 |
| PEG 300 | 20.00 | 40.0 | 27.0 |
| DI Water | 49.77 | 99.54 | 67.2 |
| Total | 100.00 | 200.0 | 135.0 |

| Weight (10 cm × 10 cm)(n = 10): | Aver Patch Weight | BRL + TRL + S | Gel/Patch Weight |
|---|---|---|---|
| Form. 11 | 11.03 g | 1.85 g | 9.18 g |
| Form. 12 | 11.26 g | 1.85 g | 9.41 g |
| Form. 13 | 9.31 g | 1.85 g | 7.46 g |

| Thickness: | Patch Thickness | BRL + TRL + S | Gel Thickness |
|---|---|---|---|
| Form. 11 | 36.6 mil | 10.8 mil | 25.8 mil |
| Form. 12 | 36.8 mil | 10.8 mil | 26.0 mil |
| Form. 13 | 32.3 mil | 10.8 mil | 21.5 mil |

TABLE 22

Results with Formulations 11-13:

| Activated Carbon Patch (C Patch) | BTDS | BTDS Extract Amount, Remained mg (%) | C Patch Extract Amount, Remained mg (%) |
|---|---|---|---|
| 20% Activated Carbon Form. 11 2 hr Contact Time | BTDS 20 mg | a. 16.23 mg (81.2%) b. 16.16 mg (80.8%) | a. ND b. ND |
| (10 cm × 10 cm)(20% C + 20% PVP + 20% PEG300) | | | |
| 20% Activated Carbon Form. 12 2 hr Contact Time | BTDS 20 mg | a. 15.36 mg (76.8%) b. 15.30 mg (76.5%) | a. 0.02 mg (0.1%) b. ND |
| (10 cm × 10 cm)(20% C + 15% PVP + 20% PEG300) | | | |
| 20% Activated Carbon Form. 13 2 hr Contact Time | BTDS 20 mg | a. 14.55 mg (72.8%) | a. 0.07 mg (0.4%) |
| (10 cm × 10 cm)(20% C + 10% PVP + 20% PEG300) | | | |
| 20% Activated Carbon Form. 11 24 hr Contact Time | BTDS 20 mg | a. 8.99 mg (45.0%) b. 8.75 mg (43.8%) | a. 0.06 mg (0.3%) b. 0.02 mg (0.1%) |
| (10 cm × 10 cm)(20% C + 20% PVP + 20% PEG300) | | | |
| 20% Activated Carbon Form. 12 24 hr Contact Time | BTDS 20 mg | a. 5.64 mg (28.2%) b. 6.40 mg (32.0%) | a. 0.06 mg (0.3%) b. 0.09 mg (0.5%) |
| (10 cm × 10 cm)(20% C + 15% PVP + 20% PEG300) | | | |

TABLE 23

Formulation 14 (10% Activated Carbon):

| Ingredients | Percent | Theoretical amount, g | Actual amount, g |
|---|---|---|---|
| PVP | 10.00 | 200.0 | 200.1 |
| Norit A Activated Carbon | 10.00 | 200.0 | 200.0 |
| Methylparaben | 0.18 | 3.6 | 3.6 |
| Propylparaben | 0.05 | 1.0 | 1.0 |
| PEG 300 | 20.00 | 400.0 | 400.2 |
| DI Water | 59.77 | 1195.4 | 1195.4 |
| Total | 100.00 | 2000.0 | 2000.3 |

TABLE 24

Formulation 15 (10% Activated Carbon):

| Ingredients | Percent | Theoretical amount, g | Actual amount, g |
|---|---|---|---|
| PVP | 15.00 | 300.0 | 300.0 |
| Norit A Activated Carbon | 10.00 | 200.0 | 200.2 |
| Methylparaben | 0.18 | 3.6 | 3.6 |
| Propylparaben | 0.05 | 1.0 | 1.0 |
| PEG 300 | 20.00 | 400.0 | 400.3 |
| DI Water | 54.77 | 1095.4 | 1095.7 |
| Total | 100.00 | 2000.0 | 2000.8 |

TABLE 25

Formulation 16 (10% Activated Carbon):

| Ingredients | Percent | Theoretical amount, g | Actual amount, g |
|---|---|---|---|
| PVP | 20.00 | 400.0 | 400.0 |
| Norit A Activated Carbon | 10.00 | 200.0 | 200.0 |
| Methylparaben | 0.18 | 3.6 | 3.6 |
| Propylparaben | 0.05 | 1.0 | 1.0 |
| PEG 300 | 20.00 | 400.0 | 400.2 |
| DI Water | 49.77 | 995.4 | 995.4 |
| Total | 100.00 | 2000.0 | 2000.2 |

| Weight (10 cm × 10 cm)(n = 10): | Aver Patch Weight | BRL + TRL + S | Gel/Patch Weight |
|---|---|---|---|
| Form. 14 | 12.01 g | 1.85 g | 10.16 g |
| Form. 15 | 10.88 g | 1.85 g | 9.03 g |
| Form. 16 | 10.83 g | 1.85 g | 8.98 g |

| Thickness: | Patch Thickness | BRL + TRL + S | Gel Thickness |
|---|---|---|---|
| Form. 14 | 38.8 mil | 10.8 mil | 28.0 mil |
| Form. 15 | 34.3 mil | 10.8 mil | 23.5 mil |
| Form. 16 | 33.0 mil | 10.8 mil | 22.2 mil |

TABLE 26

Results with Formulations 14-16

| Activated Carbon Patch (C Patch) | BTDS | BTDS Extract Amount, Remained mg (%) | C Patch Extract Amount, Remained mg (%) |
|---|---|---|---|
| 10% Activated Carbon Form. 14 24 hr Contact Time (10 cm × 10 cm)(10% C + 10% PVP + 20% PEG300) | BTDS 20 mg | a. 3.98 mg (19.9%) b. 3.96 mg (19.8%) | a. 0.10 mg (0.5%) b. 0.13 mg (0.7%) |
| 10% Activated Carbon Form. 15 24 hr Contact Time (10 cm × 10 cm)(10% C + 15% PVP + 20% PEG300) | BTDS 20 mg | a. 4.35 mg (21.8%) b. 4.66 mg (23.3%) | a. 0.10 mg (0.5%) b. 0.10 mg (0.5%) |
| 10% Activated Carbon Form. 16 24 hr Contact Time (10 cm × 10 cm)(10% C + 20% PVP + 20% PEG300) | BTDS 20 mg | a. 5.66 mg (28.3%) b. 5.22 mg (26.1%) | a. 0.08 mg (0.4%) b. 0.08 mg (0.4%) |
| 10% Activated Carbon Form. 14 48 hr Contact Time (10 cm × 10 cm)(10% C + 10% PVP + 20% PEG300) | BTDS 20 mg | a. 2.03 mg (10.2%) | a. 0.16 mg (0.8%) |
| 10% Activated Carbon Form. 15 48 hr Contact Time (10 cm × 10 cm)(10% C + 15% PVP + 20% PEG300) | BTDS 20 mg | a. 2.42 mg (12.1%) | b. 0.20 mg (1.0%) |
| 10% Activated Carbon Form. 16 48 hr Contact Time (10 cm × 10 cm)(10% C + 20% PVP + 20% PEG300) | BTDS 20 mg | a. 3.05 mg (15.3%) | a. 0.11 mg (0.6%) |

TABLE 27

Formulation 17 (20% Activated Carbon):

| Ingredients | Percent | Theoretical amount, g | Actual amount, g |
|---|---|---|---|
| PVP | 10.00 | 100.0 | 100.1 |
| Norit A Activated Carbon | 20.00 | 200.0 | 200.0 |
| Methylparaben | 0.18 | 1.8 | 1.8 |
| Propylparaben | 0.05 | 0.5 | 0.5 |
| PEG 300 | 20.00 | 200.0 | 199.9 |
| DI Water | 49.77 | 497.7 | 497.7 |
| Total | 100.00 | 1000.0 | 1000.0 |

TABLE 28

Formulation 18 (20% Activated Carbon):

| Ingredients | Percent | Theoretical amount, g | Actual amount, g |
|---|---|---|---|
| PVP | 10.00 | 100.0 | 100.0 |
| Norit A Activated Carbon | 20.00 | 200.0 | 200.0 |
| Methylparaben | 0.18 | 1.8 | 1.8 |
| Propylparaben | 0.05 | 0.5 | 0.5 |
| Levulinic Acid | 5.00 | 50.0 | 50.0 |
| PEG 300 | 20.00 | 200.0 | 200.6 |
| DI Water | 44.77 | 447.7 | 447.7 |
| Total | 100.00 | 1000.0 | 1000.6 |

| Weight (10 cm × 10 cm)(n = 10): | Aver Patch Weight | BRL + TRL + S | Gel/Patch Weight |
|---|---|---|---|
| Form. 17 | 11.30 g | 1.85 g | 9.45 g |
| Form. 18 | 11.32 g | 1.85 g | 9.47 g |

| Thickness: | Patch Thickness | BRL + TRL + S | Gel Thickness |
|---|---|---|---|
| Form. 17 | 37.0 mil | 10.8 mil | 26.2 mil |
| Form. 18 | 36.6 mil | 10.8 mil | 25.8 mil |

TABLE 29

Results with Formulations 17 and 18:

| Activated Carbon Patch (C Patch) | BTDS | BTDS Extract Amount, Remained mg (%) | C Patch Extract Amount, Remained mg (%) |
|---|---|---|---|
| 20% Activated Carbon Form. 17 2 hr Contact Time | BTDS 20 mg | a. 14.65 mg (73.3%) b. 14.46 mg (72.3%) | a. ND b. ND |
| (10 cm × 10 cm)(20% C + 10% PVP + 20% PEG300) | | | |
| 20% Activated Carbon Form. 17 24 hr Contact Time | BTDS 20 mg | a. 2.00 mg (10.0%) b. 2.33 mg (11.7%) | a. ND b. ND |
| (10 cm × 10 cm)(20% C + 10% PVP + 20% PEG300) | | | |
| 20% Activated Carbon Form. 17 48 hr Contact Time | BTDS 20 mg | a. 0.83 mg (4.2%) b. 0.83 mg (4.2%) | a. ND b. ND |
| (10 cm × 10 cm)(20% C + 10% PVP + 20% PEG300) | | | |
| 20% Norit A Supra USP Form. 18 2 hr Contact Time | BTDS 20 mg | a. 14.47 mg (72.4%) b. 14.11 mg (70.6%) | a. ND b. ND |
| (10 cm × 10 cm)(20% C + 10% PVP + 20% PEG300 + 5% Levulinic Acid) | | | |
| 20% Norit A Supra USP Form. 18 24 hr Contact Time | BTDS 20 mg | a. 2.19 mg (11.0%) b. 2.40 mg (12.0%) | a. 0.30 (1.5%) b. 0.68 (3.4%) |
| (10 cm × 10 cm)(20% C + 10% PVP + 20% PEG300 + 5% Levulinic Acid) | | | |
| 20% Norit A Supra USP Form. 18 48 hr Contact Time | BTDS 20 mg | a. 0.89 mg (4.5%) b. 0.64 mg (3.2%) | a. 0.36 (1.8%) b. 0.36 (1.8%) |
| (10 cm × 10 cm)(20% C + 10% PVP + 20% PEG300 + 5% Levulinic Acid) | | | |

TABLE 30

Formulation 19 (20% Activated Carbon):

| Ingredients | Percent | Theoretical amount, g | Actual amount, g |
|---|---|---|---|
| PVP | 10.00 | 300.0 | 300.1 |
| Norit A Activated Carbon | 20.00 | 600.0 | 600.0 |
| Methylparaben | 0.18 | 5.4 | 5.4 |
| Propylparaben | 0.05 | 1.5 | 1.5 |
| PEG 300 | 20.00 | 600.0 | 600.0 |
| DI Water | 49.77 | 1493.1 | 1492.9 |
| Total | 100.00 | 3000.0 | 2999.8 |

TABLE 30-continued

Formulation 19 (20% Activated Carbon):

| Weight (10 cm × 10 cm)(n = 120): | Aver Patch Weight | BRL + TRL + S | Gel/Patch Weight |
|---|---|---|---|
| Form. 19 | 11.09 g | 2.24 g | 8.85 g |
| Thickness: | Patch Thickness | BRL + TRL + S | Gel Thickness |
| Form. 19 | 36.3 mil | 13.8 mil | 22.5 mil |

TABLE 31

Results with Formulation 19:

| Activated Carbon Patch (C Patch) | BTDS | BTDS Extract Amount, Remained mg (%) | C Patch Extract Amount, Remained mg (%) |
|---|---|---|---|
| 20% Activated Carbon Form. 19 1 hr Contact Time | BTDS 20 mg | a. 16.16 mg (80.8%) b. 16.20 mg (81.0%) c. 16.56 mg (82.8%) Aver: 16.31 mg (81.6%) | a. 0.011 mg (0.06%) b. 0.013 mg (0.07%) c. 0.009 mg (0.05%) 0.011 mg (0.06%) |
| (10 cm × 10 cm)(20% C + 10% PVP + 20% PEG300) | | | |
| 20% Activated Carbon Form. 19 2 hr Contact Time | BTDS 20 mg | a. 14.80 mg (74.0%) b. 14.74 mg (73.7%) c. 14.78 mg (73.9%) Aver: 14.77 mg (73.9%) | a. 0.056 mg (0.28%) b. 0.028 mg (0.14%) c. 0.021 mg (0.11%) 0.035 mg (0.18%) |
| (10 cm × 10 cm)(20% C + 10% PVP + 20% PEG300) | | | |

TABLE 31-continued

Results with Formulation 19:

| Activated Carbon Patch (C Patch) | BTDS | BTDS Extract Amount, Remained mg (%) | C Patch Extract Amount, Remained mg (%) |
|---|---|---|---|
| 20% Activated Carbon Form. 19 4 hr Contact Time | BTDS 20 mg | a. 12.17 mg (60.9%) b. 12.47 mg (62.4%) c. 12.51 mg (62.6%) Aver: 12.38 mg (61.9%) (10 cm × 10 cm)(20% C + 10% PVP + 20% PEG300) | a. 0.039 mg (0.20%) b. 0.030 mg (0.15%) c. 0.025 mg (0.13%) 0.031 mg (0.16%) |
| 20% Activated Carbon Form. 19 8 hr Contact Time | BTDS 20 mg | a. 8.86 mg (44.3%) b. 9.08 mg (45.4%) c. 9.38 mg (46.9%) Aver: 9.11 mg (45.6%) (10 cm × 10 cm)(20% C + 10% PVP + 20% PEG300) | a. 0.090 mg (0.45%) b. 0.039 mg (0.20%) c. 0.047 mg (0.24%) 0.059 mg (0.30%) |
| 20% Activated Carbon Form. 19 24 hr Contact Time | BTDS 20 mg | a. 3.56 mg (17.8%) b. 3.64 mg (18.2%) c. 3.58 mg (17.9%) Aver: 3.59 mg (18.0%) (10 cm × 10 cm)(20% C + 10% PVP + 20% PEG300) | a. 0.045 mg (0.23%) b. 0.047 mg (0.24%) c. 0.054 mg (0.27%) 0.049 mg (0.25%) |
| 20% Activated Carbon Form. 19 1 hr Contact Time | BTDS 5 mg | a. 4.03 mg (80.6%) b. 4.09 mg (81.8%) c. 4.08 mg (81.6%) Aver: 4.07 mg (81.4%) (10 cm × 10 cm)(20% C + 10% PVP + 20% PEG300) | a. ND b. ND c. ND ND |
| 20% Activated Carbon Form. 19 2 hr Contact Time | BTDS 5 mg | a. 3.82 mg (76.4%) b. 3.81 mg (76.2%) c. 3.79 mg (75.8%) Aver: 3.81 mg (76.2%) (10 cm × 10 cm)(20% C + 10% PVP + 20% PEG300) | a. 0.004 mg (0.08%) b. ND c. 0.008 mg (0.16%) 0.004 mg (0.08%) |
| 20% Activated Carbon Form. 19 1 hr Contact Time | BTDS 5 mg | a. 4.03 mg (80.6%) b. 4.09 mg (81.8%) c. 4.08 mg (81.6%) Aver: 4.07 mg (81.4%) (10 cm × 10 cm)(20% C + 10% PVP + 20% PEG300) | a. ND b. ND c. ND ND |
| 20% Activated Carbon Form. 19 2 hr Contact Time | BTDS 5 mg | a. 3.82 mg (76.4%) b. 3.81 mg (76.2%) c. 3.79 mg (75.8%) Aver: 3.81 mg (76.2%) (10 cm × 10 cm)(20% C + 10% PVP + 20% PEG300) | a. 0.004 mg (0.08%) b. ND c. 0.008 mg (0.16%) 0.004 mg (0.08%) |
| 20% Activated Carbon Form. 19 4 hr Contact Time | BTDS 5 mg | a. 3.33 mg (66.6%) b. 3.50 mg (70.0%) c. 3.40 mg (68.0%) Aver: 3.41 mg (68.2%) (10 cm × 10 cm)(20% C + 10% PVP + 20% PEG300) | a. 0.006 mg (0.12%) b. 0.009 mg (0.18%) c. ND 0.005 mg (0.1%) |
| 20% Activated Carbon Form. 19 8 hr Contact Time | BTDS 5 mg | a. 2.62 mg (52.4%) b. 2.60 mg (52.0%) c. 2.65 mg (53.0%) Aver: 2.62 mg (52.4%) (10 cm × 10 cm)(20% C + 10% PVP + 20% PEG300) | a. 0.010 mg (0.20%) b. 0.007 mg (0.14%) c. 0.007 mg (0.14%) 0.008 mg (0.20%) |
| 20% Activated Carbon Form. 19 24 hr Contact Time | BTDS 5 mg | a. 1.34 mg (26.8%) b. 1.24 mg (24.8%) c. 1.15 mg (23.0%) Aver: 1.24 mg (24.8%) (10 cm × 10 cm)(20% C + 10% PVP + 20% PEG300) | a. 0.007 mg (0.14%) b. 0.019 mg (0.38%) c. 0.015 mg (0.30%) 0.014 mg (0.3%) |

Example 3. The Effect of Moisture on Drug Adsorption of the Drug Disposal Device To determine the effect of moisture on the ability of the drug disposal devices to reduce the level of drug in a transdermal patch, transdermal patches containing either 20 mg or 5 mg buprenorphine were kept in a desiccator with a relative humidity of 100% for a period of 7 days at room temperature. The transdermal patches were then contacted with a drug disposal device manufactured using Formulation 19 according to Example 2 for 1, 2, 4, 8, and 24 hours. The drug disposal devices and transdermal patches were separated and each extracted with 100 mL methanol for 24 hours. Buprenorphine levels were determined via HPLC. The results are summarized in Table 32.

TABLE 32

Effect of Moisture on Buprenorphine Extraction.

| Activated Carbon Patch (C Patch) | BTDS | BTDS Extract Amount, Remained mg (%) | C Patch Extract Amount, Remained mg (%) |
|---|---|---|---|
| 20% Activated Carbon Form. 19 1 hr Contact Time | BTDS 20 mg | a. 16.15 mg (80.8%) b. 16.08 mg (80.4%) c. 16.03 mg (80.2%) Aver: 16.09 mg (80.5%) | a. 0.008 mg (0.040%) b. 0.011 mg (0.055%) c. 0.009 mg (0.045%) 0.009 mg (0.050%) |
| (10 cm × 10 cm)(20% C + 10% PVP + 20% PEG300) | | | |
| 20% Activated Carbon Form. 19 2 hr Contact Time | BTDS 20 mg | a. 14.66 mg (73.3%) b. 14.18 mg (70.9%) c. 14.81 mg (74.1%) Aver: 14.55 mg (72.8%) | a. 0.013 mg (0.065%) b. 0.018 mg (0.090%) c. 0.011 mg (0.055%) 0.014 mg (0.07%) |
| (10 cm × 10 cm)(20% C + 10% PVP + 20% PEG300) | | | |
| 20% Activated Carbon Form. 19 4 hr Contact Time | BTDS 20 mg | a. 11.95 mg (59.8%) b. 12.08 mg (60.4%) c. 11.99 mg (60.0%) Aver: 12.01 mg (60.1%) | a. 0.022 mg (0.11%) b. 0.010 mg (0.05%) c. 0.015 mg (0.08%) 0.016 mg (0.08%) |
| (10 cm × 10 cm)(20% C + 10% PVP + 20% PEG300) | | | |
| 20% Activated Carbon Form. 19 8 hr Contact Time | BTDS 20 mg | a. 8.63 mg (43.2%) b. 8.87 mg (44.4%) c. 8.61 mg (43.1%) Aver: 8.70 mg (43.5%) | a. 0.043 mg (0.22%) b. 0.022 mg (0.11%) c. 0.045 mg (0.23%) 0.037 mg (0.19%) |
| (10 cm × 10 cm)(20% C + 10% PVP + 20% PEG300) | | | |
| 20% Activated Carbon Form. 19 24 hr Contact Time | BTDS 20 mg | a. 3.74 mg (18.7%) b. 3.41 mg (17.1%) c. 3.22 mg (16.1%) Aver: 3.46 mg (17.3%) | a. 0.055 mg (0.275%) b. 0.052 mg (0.26%) c. 0.059 mg (0.30%) 0.055 mg (0.28%) |
| (10 cm × 10 cm)(20% C + 10% PVP + 20% PEG300) | | | |
| 20% Activated Carbon Form. 19 1 hr Contact Time | BTDS 5 mg | a. 4.08 mg (81.6%) b. 4.08 mg (81.6%) c. 4.05 mg (81.0%) Aver: 4.07 mg (81.4%) | a. ND b. ND c. ND ND |
| (10 cm × 10 cm)(20% C + 10% PVP + 20% PEG300) | | | |
| 20% Activated Carbon Form. 19 2 hr Contact Time | BTDS 5 mg | a. 3.76 mg (75.2%) b. 3.82 mg (76.4%) c. 3.80 mg (76.0%) Aver: 3.79 mg (75.8%) | a. ND b. ND c. 0.007 mg (0.14%) 0.002 mg (0.04%) |
| (10 cm × 10 cm)(20% C + 10% PVP + 20% PEG300) | | | |
| 20% Activated Carbon Form. 19 4 hr Contact Time | BTDS 5 mg | a. 3.30 mg (66.0%) b. 3.29 mg (65.8%) c. 3.35 mg (67.0%) Aver: 3.31 mg (66.2%) | a. 0.005 mg (0.10%) b. ND c. ND 0.002 mg (0.04%) |
| (10 cm × 10 cm)(20% C + 10% PVP + 20% PEG300) | | | |
| 20% Activated Carbon Form 19 8 hr Contact Time | BTDS 5 mg | a. 2.54 mg (50.8%) b. 2.61 mg (52.2%) c. 2.59 mg (51.8%) Aver: 2.58 mg (51.6%) | a. 0.008 mg (0.16%) b. 0.006 mg (0.12%) c. 0.007 mg (0.14%) 0.007 mg (0.14%) |
| (10 cm × 10 cm)(20% C + 10% PVP + 20% PEG300) | | | |
| 20% Activated Carbon Form. 19 24 hr Contact Time | BTDS 5 mg | a. 1.21 mg (24.2%) b. 1.28 mg (25.6%) c. 1.28 mg (25.6%) Aver: 1.26 mg (25.2%) | a. 0.008 mg (0.16%) b. 0.015 mg (0.30%) c. 0.014 mg (0.28%) 0.012 mg (0.24%) |
| (10 cm × 10 cm)(20% C + 10% PVP + 20% PEG300) | | | |

Example 4. Back Extraction from Activated Carbon

In order to study the adsorption of buprenorphine base on activated carbon, two different steam activated carbon preparations were compared at 1%, 5%, 10%, 15%, and 20% concentrations. Specifically, NORIT A Supra activated carbon was compared to NORIT E Supra activated carbon (Cabot NORIT Activated Carbon, Cabot Corporation, Alpharetta Ga.). Table 33 provides a comparison of the two activated carbon preparations.

TABLE 33

Activated Carbon Preparations.

| Property | NORIT A SUPRA USP | NORIT E SUPRA USP |
|---|---|---|
| Iodine number | 1550 | 850 |
| Molasses number | 430 | 240 |
| Surface Area (BET) | 1700 m$^2$/g | 900 m$^2$/g |
| Apparent density | 0.42 g/mL | 0.36 g/mL |

TABLE 33-continued

Activated Carbon Preparations.

| Property | | NORIT A SUPRA USP | NORIT E SUPRA USP |
|---|---|---|---|
| Particle Size | d10 | 4 μm | 5 μm |
| | d50 | 20 μm | 23 μm |
| | d90 | 100 μm | 100 μm |
| Ash, mass % | | 2% | 3% |
| Filtration time | | 40 min | 13 min |

Briefly, a 20 mg/mL buprenorphine base solution was made in 25 mL methanol. Activated carbon samples containing 1%, 5%, 10%, 15%, or 20% activated carbon in 20 mL deionized water were prepared for both NORIT A and NORIT E. Each 20 mL activated carbon sample was combined with 1 mL of the 20 mg/mL buprenorphine solution and kept on a mechanical shaker for 16 hours at 300 rpm. The samples were filtered (Whatman 1 filter paper, Mfr. No. 1001-150, particle retention greater than 11 μm, medium porosity) and then analyzed by HPLC using art standard techniques to determine the amount of adsorbed buprenorphine. The results are summarized in Table 34 and reveal that the buprenorphine base was completely adsorbed on activated carbon for each preparation.

TABLE 34

Buprenorphine Remaining

| Sample | Buprenorphine Base Concentrations, μg/mL |
|---|---|
| 1% Norit A | Not Detected |
| 5% Norit A | Not Detected |
| 10% Norit A | Not Detected |
| 15% Norit A | Not Detected |
| 20% Norit A | Not Detected |
| 1% Norit E | Not Detected |
| 5% Norit E | Not Detected |
| 10% Norit E | Not Detected |
| 15% Norit E | Not Detected |
| 20% Norit E | Not Detected |

To determine the amount of buprenorphine that could be back extracted from activated carbon with methanol, the filter papers containing the 1% and 5% activated carbon samples were transferred to a 500 mL conical flask, and 50 mL of methanol was added. Samples were extracted on a mechanical shaker for 16 hours at 300 rpm. Samples were then analyzed by HPLC using art standard techniques to determine the amount of buprenorphine back extracted in each. The results are summarized in Table 35.

TABLE 35

Back Extraction of Buprenorphine with Methanol

| Sample | Buprenorphine Base Amount, mg (%) |
|---|---|
| 1% Norit A | 0.01 mg (0.05%) |
| 5% Norit A | Not Detected |
| 1% Norit E | 1.65 mg (8.3%) |
| 5% Norit E | 0.04 mg (0.2%) |

The results in Table 35 show that the absorptivity of NORIT A is better than NORIT E and absorptivity is higher at 5% level compared to 1% level of activated carbon. The back extraction study was repeated using ethyl acetate. The results are summarized in Table 36.

TABLE 36

Back Extraction of Buprenorphine with Ethyl Acetate

| Sample | Buprenorphine Base Amount, mg (%) |
|---|---|
| 1% Norit A | 0.13 mg (0.65%) |
| 5% Norit A | Not Detected |
| 1% Norit E | 0.84 mg (4.2%) |
| 5% Norit E | Not Detected |

To determine the ability of activated carbon to adsorb buprenorphine from buprenorphine transdermal patches, 5% and 10% NORIT A solutions were prepared in 125 mL conical flasks with 50 mL deionized water. Buprenorphine transdermal patches containing 20 mg buprenorphine were cut into 8 pieces and added to the flasks. The samples were kept on a mechanical shaker for 24 hours at 300 rpm. Each sample was filtered through 11 μm filter paper and analyzed by HPLC using art standard methods to determine the amount of buprenorphine. The results are shown in Table 37 and reveal that buprenorphine was completed adsorbed on the activated carbon.

TABLE 37

Buprenorphine Adsorption from Transdermal Patches

| Sample | Buprenorphine Base Concentrations, μg/mL |
|---|---|
| 5% Norit A (n = 2) | Not Detected |
| 10% Norit A (n = 3) | Not Detected |

To determine the ability to back extract buprenorphine from the activated carbon, the filter papers and the transdermal patch pieces from each sample in the previous study were transferred to a 250 mL conical flask. 100 mL of methanol was added to each flask and extracted on a mechanical shaker for 24 hours at 300 rpm. The samples were filtered through 11 μm filter paper and then analyzed by HPCL. The results are summarized in Table 38.

TABLE 38

Back Extraction of Buprenorphine with Methanol

| Sample | Buprenorphine Base Concentrations, μg/mL |
|---|---|
| 5% Norit A (n = 2) | Not Detected |
| 10% Norit A (n = 3) | Not Detected |

As shown in Table 38, buprenorphine was completely adsorbed by the activated carbon and could not be back extracted with methanol.

Example 5. Fentanyl Extraction Tests

A hydrogel formulation was prepared as described in Example 1 and stored at room temperature for several days to de-aerate. The hydrogel formulation composition is summarized in Table 39. Single coated 2.3 mil polyester medical tape with acrylic adhesive (#1516 3M Products) was used as a backing film. The hydrogel was coated onto the backing film at targeted thickness of about 26 mil to about 30 mil using a stainless steel slot die machine. A 4.8 mil REEMAY 2004 polyester scrim (Fiberweb, Inc.) was laid into the surface of the hydrogel. Next, a 7 mil LDPE top release liner (Berry Plastics (Covalence)) was laminated over the scrim and hydrogel. The laminated assembly was crosslinked by passing it through a DYNAMITRON DPC-2000 electron beam accelerator (IVA Industrial) at the appropriate process parameters (1.0 MeV, 6.0 mA, 10 feet per minute). After crosslinking the hydrogel assembly, the material was collected for cutting and pouching. The assembly was cut to 52 mm×52 mm and 79 mm×79 mm size patches using a cutting press and steel rule die. Table 39 provides exemplary measurements for the drug disposal devices made according to this Example 5. The Patches were placed into foil pouches, sealed and labeled.

TABLE 39

| 20% Activated Carbon Patch Formulation: | | |
| --- | --- | --- |
| Ingredients | Percent, % | Amount, gms |
| Kollidon 90F (PVP) | 10.00 | 800.00 |
| Norit A Supra USP (Activated Carbon) | 20.00 | 1600.20 |
| Methylparaben | 0.18 | 14.40 |
| Propylparaben | 0.05 | 4.00 |
| Polyethylene Glycol 300 (PEG 300) | 20.00 | 1600.00 |
| Purified Water | 49.77 | 3981.60 |
| Total | 100.00 | 8,000.20 |
| Size | 52 mm × 52 mm | 79 mm × 79 mm |
| Average Patch Gross Weight | 2.751 g | 6.411 g |
| Backing + Scrim + Release Liner Weight | 0.681 g | 1.574 g |
| Gel per Patch Weight | 2.070 g | 4.837 g |
| Patch Thickness | 0.0265"-0.0300" | 0.0265"-0.0300" |
| Backing Film | 3M 1516 | 3M 1516 |

To assess the ability of the drug disposal devices (Activated Carbon Patches or C Patches) to reduce the level of drug from a transdermal patch, the release liner was peeled off of the drug disposal devices, and the drug disposal devices were then attached to fentanyl transdermal patches (FTDS) containing either a 25 mcg/h dose or a 100 mcg/h dose of fentanyl (Core Tech Solutions, Inc.).

For the 25 mcg/h fentanyl transdermal patches, the drug-containing adhesive of the fentanyl transdermal patch was contacted to the activated carbon layer of a 52 mm×52 mm drug disposal device for 2, 4, 6, or 24 hours. First, the polyester release liner was removed from the activated carbon layer of the drug disposal device. Next, the fentanyl transdermal patch was contacted to the activated carbon layer. The polyester liner was then placed back over the drug disposal device and fentanyl transdermal patch to minimize skin contact and exposure. At each time interval, the fentanyl 25 mcg/h transdermal patches were separated from drug disposal devices, and each were extracted separately. The fentanyl 25 mcg/h transdermal patches were extracted with 50 mL of 95% ethanol for 4 hours on the mechanical shaker at room temperature, while the 52 mm×52 mm drug disposal devices were cut into pieces and extracted with 50 mL of 95% ethanol for 24 hours on the mechanical shaker at room temperature.

For the 100 mcg/h fentanyl transdermal patch, the drug-containing adhesive of the fentanyl transdermal patch was contacted to the activated carbon layer of a 79 mm×79 mm drug disposal device for 0.5, 2, 4, 6, or 24 hours. First, the polyester release liner was removed from the activated carbon layer of the drug disposal device. Next, the fentanyl transdermal patch was contacted to the activated carbon layer. The polyester liner was then placed back over the drug disposal device and fentanyl transdermal patch to minimize skin contact and exposure. At each time interval, the fentanyl 100 mcg/h transdermal patches were separated from drug disposal devices, and each were extracted separately. The fentanyl 100 mcg/h transdermal patches were extracted with 100 mL of 95% ethanol for 4 hours on the mechanical shaker at room temperature, while the 79 mm×79 mm drug disposal devices were cut into pieces and extracted with 100 mL of 95% ethanol for 24 hours on the mechanical shaker at room temperature.

All samples were filtered and analyzed using HPLC according to art standard methods. More than 98% of the fentanyl was adsorbed by the drug disposal devices after 24 hours of contact, and less than 10% of the adsorbed fentanyl was extractable from the drug disposal devices after 24 hours. The extraction test results are summarized in Table 40 and Table 41.

TABLE 40

| Extraction Results for 25 mcg/h FTDS (3.06 mg fentanyl/patch) | | | |
| --- | --- | --- | --- |
| Activated Carbon Patch (C Patch) | Fentanyl TDS | FTDS Extract Amount Extracted mg (%) | C Patch Extract Amount Extracted mg (%) |
| 20% Carbon Patch 2 hr Contact Time (52 mm × 52 mm) | FTDS 25 mcg/h | a. 1.32 mg (44.0%) b. 1.29 mg (43.0%) | a. 0.09 mg (3.0%) b. 0.08 mg (2.7%) |
| 20% Carbon Patch 4 hr Contact Time (52 mm × 52 mm) | FTDS 25 mcg/h | a. 0.69 mg (23.0%) b. 0.66 mg (22.0%) | a. 0.12 mg (4.0%) b. 0.16 mg (5.3%) |
| 20% Carbon Patch 6 hr Contact Time (52 mm × 52 mm) | FTDS 25 mcg/h | a. 0.40 mg (13.3%) b. 0.46 mg (15.3%) c. 0.40 mg (13.3%) | a. 0.15 mg (5.0%) b. 0.22 mg (7.3%) c. 0.19 mg (6.3%) |
| 20% Carbon Patch 24 hr Contact Time | FTDS 25 mcg/h | a. 0.06 mg (2.0%) b. 0.05 mg (1.7%) c. 0.05 mg (1.7%) | a. 0.19 mg (6.3%) b. 0.10 mg (3.3%) c. 0.23 mg (7.7%) |

TABLE 41

Extraction Results for 100 mcg/h FTDS (11.98 mg fentanyl/patch)

| Activated Carbon Patch (C Patch) | Fentanyl TDS | FTDS Extract Amount Extracted mg (%) | C Patch Extract Amount Extracted mg (%) |
|---|---|---|---|
| 20% Carbon Patch 0.5 hr Contact Time (79 mm × 79 mm) | FTDS 100 mcg/h | a. 8.06 mg (67.2%) b. 8.02 mg (66.8%) c. 8.04 mg (67.0%) | a. 0.19 mg (1.6%) b. 0.21 mg (1.8%) c. 0.17 mg (1.4%) |
| 20% Carbon Patch 2 hr Contact Time (79 mm × 79 mm) | FTDS 100 mcg/h | a. 4.82 mg (40.2%) b. 4.62 mg (38.5%) c. 4.81 mg (40.1%) | a. 0.39 mg (3.3%) b. 0.39 mg (3.3%) c. 0.41 mg (3.4%) |
| 20% Carbon Patch 4 hr Contact Time (79 mm × 79 mm) | FTDS 100 mcg/h | a. 2.49 mg (20.8%) b. 2.69 mg (22.4%) c. 2.47 mg (20.6%) | a. 0.66 mg (5.5%) b. 0.58 mg (4.8%) c. 0.59 mg (4.9%) |
| 20% Carbon Patch 6 hr Contact Time (79 mm × 79 mm) | FTDS 100 mcg/h | a. 1.67 mg (13.9%) b. 1.43 mg (11.9%) c. 1.43 mg (11.9%) | a. 0.69 mg (5.8%) b. 0.69 mg (5.8%) c. 0.70 mg (5.8%) |
| 20% Carbon Patch Lot# L100628-3 24 hr Contact Time (79 mm × 79 mm) | FTDS 100 mcg/h Lot# F052616 | a. 0.13 mg (1.1%) b. 0.17 mg (1.4%) c. 0.12 mg (1.0%) | a. 0.79 mg (6.6%) b. 0.82 mg (6.8%) c. 0.84 mg (7.0%) |

The present invention is not to be limited in scope by the specific embodiments disclosed in the examples, which are intended as illustrations of several aspects of the invention. Any embodiments that are functionally equivalent are within the scope of this invention. Indeed, various modifications of the invention in addition to those shown and described herein will become apparent to those skilled in the art and are intended to fall within the scope of the appended claims.

I claim:

1. A drug disposal device for reducing an amount of drug contained in a transdermal patch, the drug disposal device comprising:
   (a) an adsorbing layer having a first surface and a second surface, wherein the adsorbing layer comprises a hydrogel, and wherein the hydrogel is a homogeneous mixture of gel components comprising;
      (i) at least about 5% by weight activated carbon;
      (ii) a binding agent; and
      (iii) one or more polyols selected from the group consisting of glycerol, polyethylene glycol and a combination of glycerol and polyethylene glycol;
   (b) a release liner disposed on the first surface of the adsorbing layer; and
   (c) a backing film disposed on the second surface of the adsorbing layer.

2. The drug disposal device of claim 1, wherein the hydrogel is substantially free of air.

3. The drug disposal device of claim 1, wherein the one or more polyol comprises (1) about 15% by weight to about 25% by weight polyethylene glycol having an average molecular weight in the range from about 200 g/mol to about 500 g/mol; or (2) about 1% by weight to about 15% by weight polyethylene glycol having an average molecular weight in the range from about 600 g/mol to about 1,000 g/mol; and wherein the activated carbon has:
   (a) a specific surface area in the range from about 850 $m^2/g$ to about 1,900 $m^2/g$;
   (b) a particle size d50 in the range from about 15 μm to about 30 μm; and
   (c) an iodine number in the range from about 800 to about 1,750.

4. The drug disposal device of claim 3, wherein the average molecular weight of the polyethylene glycol is in the range from about 300 g/mol to about 500 g/mol; and wherein the activated carbon has:
   (a) a specific surface area in the range from about 1,650 $m^2/g$ to about 1,750 $m^2/g$;
   (b) a particle size d50 in the range from about 18 μm to about 22 μm; and
   (c) an iodine number in the range from about 1,500 to about 1,700.

5. The drug disposal device of claim 1, wherein the gel components further comprise at least one preservative, and wherein the at least one preservative is a paraben compound.

6. The drug disposal device of claim 1, wherein the binding agent is a thermoplastic polymer.

7. The drug disposal device of claim 6, wherein the thermoplastic polymer is polyvinyl pyrrolidone.

8. The drug disposal device of claim 1, further comprising a scrim substantially embedded in the hydrogel of the adsorbing layer.

9. The drug disposal device of claim 1, wherein the hydrogel of the adsorbing layer has a thickness in the range from about 15 mil to about 45 mil.

10. The drug disposal device of claim 1, wherein the hydrogel comprises:
    (i) about 10% to about 25% by weight activated carbon;
    (ii) about 5% to about 25% by weight polyvinyl pyrrolidone;
    (iii) about 15% to about 25% by weight polyethylene glycol having an average molecular weight of about 300 g/mol;
    (iv) one or more paraben compounds; and
    (v) water.

11. A method for reducing the amount of drug contained in a transdermal patch, the method comprising:
    (a) providing a drug disposal device comprising:
       (i) an adsorbing layer having a first surface and a second surface, wherein the adsorbing layer comprises a homogeneous hydrogel having a thickness in the range from about 15 mil to about 45 mil, the homogeneous hydrogel comprising:
- (A) at least about 10% by weight steam-activated carbon;
- (B) a thermoplastic polymer binding agent; and
- (C) a polyol selected from the group consisting of glycerol and polyethylene glycol;

wherein the homogenous hydrogel is substantially free of air;
(ii) a scrim substantially embedded in the hydrogel of the adsorbing layer;
(ii) a release liner disposed on the first surface of the adsorbing layer; and
(iii) a backing film disposed on the second surface of the adsorbing layer;
(b) removing the release liner, whereby the first surface of the adsorbing layer is exposed; and
(c) contacting a drug delivery layer of the transdermal patch with the first surface of the adsorbing layer, wherein the drug delivery layer comprises an amount of drug, and wherein the contact reduces the amount of drug in the delivery layer.

12. The method of claim 11, wherein:
the steam-activated carbon has a surface area in the range from about 850 $m^2/g$ to about 1,800 $m^2/g$, a particle size d50 in the range from about 15 μm to about 30 μm, and a iodine number in the range from about 800 to about 1,750; and
wherein homogeneous hydrogel comprises (1) about 15% by weight to about 25% by weight polyethylene glycol having an average molecular weight in the range from about 200 g/mol to about 500 g/mol; or (2) about 1% by weight to about 15% by weight polyethylene glycol having an average molecular weight in the range from about 600 g/mol to about 1,000 g/mol.

13. The method of claim 11, wherein the thermoplastic polymer is polyvinyl pyrrolidone.

14. The method of claim 11, wherein the amount of drug is at least about 1 mg opioid and the transdermal pouch is skin worn.

15. The method of claim 11, wherein the contact is for at least about 1 hour.

16. A method of manufacturing a drug disposal device, wherein the method comprises:
(1) producing a homogenous hydrogel mixture by combining a set of ingredients, the ingredients comprising:
- (a) at least about 5% by weight activated carbon;
- (b) a binding agent;
- (c) glycerol or polyethylene glycol; and
- (d) a water component;

(2) coating the homogenous hydrogel onto a release liner at a thickness of at least about 25 mil to about 35 mil to produce a homogenous hydrogel layer
(3) disposing onto the homogenous hydrogel layer a scrim, wherein the scrim is substantially embedded into the homogenous hydrogel;
(4) disposing onto the scrim and homogenous hydrogel layer a backing film; and
(5) crosslinking the homogenous hydrogel layer.

17. The method of claim 16, wherein the step of producing the homogeneous hydrogel mixture further comprises the steps of:
- (a) combining the activated carbon and the water component and mixing until homogenous to produce an activated carbon mixture;
- (b) adding the binding agent to the activated carbon mixture to produce a binding and activated carbon mixture; and
- (c) adding the glycerol or polyethylene glycol to the binding and activated carbon mixture and mixing to homogeneity to produce the homogenized hydrogel mixture.

18. The method of claim 16, wherein the homogenous hydrogel mixture is stored for a period of at least 5 days to de-aerate prior to coating onto the release liner.

19. The method of claim 16, wherein the crosslinking comprises ionizing radiation.

20. The method of claim 16, wherein the homogenous hydrogel ingredients further comprise:
- (a) about 20% by weight activated carbon;
- (b) about 10% binding agent;
- (c) about 20% polyethylene glycol; and
- (d) a water component.

* * * * *